US011437050B2

(12) United States Patent
Skordilis et al.

(10) Patent No.: US 11,437,050 B2
(45) Date of Patent: Sep. 6, 2022

(54) ARTIFICIAL INTELLIGENCE BASED AUDIO CODING

(71) Applicant: QUALCOMM Incorporated, San Diego, CA (US)

(72) Inventors: Zisis Iason Skordilis, San Diego, CA (US); Vivek Rajendran, San Diego, CA (US); Guillaume Konrad Sautière, Amsterdam (NL); Daniel Jared Sinder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 16/709,873

(22) Filed: Dec. 10, 2019

(65) Prior Publication Data

US 2021/0074308 A1    Mar. 11, 2021

(30) Foreign Application Priority Data

Sep. 9, 2019    (GR) .............................. 20190100387

(51) Int. Cl.
| | |
|---|---|
| *G10L 19/13* | (2013.01) |
| *G06N 3/08* | (2006.01) |
| *G10L 25/30* | (2013.01) |
| *G10L 19/09* | (2013.01) |
| *G10L 19/12* | (2013.01) |
| *G10L 19/08* | (2013.01) |
| *G06N 3/04* | (2006.01) |

(52) U.S. Cl.
CPC .............. *G10L 19/13* (2013.01); *G06N 3/084* (2013.01); *G10L 19/09* (2013.01); *G10L 25/30* (2013.01)

(58) Field of Classification Search
CPC ......... G10L 19/13; G10L 25/30; G10L 19/09; G10L 19/12; G10L 19/08; G06N 3/084
See application file for complete search history.

(56) References Cited

U.S. PATENT DOCUMENTS 5,737,485 A * 4/1998 Flanagan ................ G10L 15/16
704/232
6,067,518 A * 5/2000 Morii ...................... G10L 19/09
704/E19.041

(Continued)

FOREIGN PATENT DOCUMENTS

RU          2495504 C1    10/2013

OTHER PUBLICATIONS

Patil, Multilayered Network for LPC Based Speech Recognition, IEEE Transactions on Consumer Electronics, vol. 44, No. 2, May 1998; pp. 435-438 (Year: 1998).*

(Continued)

*Primary Examiner* — Michael N Opsasnick
(74) *Attorney, Agent, or Firm* — Qualcomm Incorporated

(57) ABSTRACT

Techniques are described for coding audio signals. For example, using a neural network, a residual signal is generated for a sample of an audio signal based on inputs to the neural network. The residual signal is configured to excite a long-term prediction filter and/or a short-term prediction filter. Using the long-term prediction filter and/or the short-term prediction filter, a sample of a reconstructed audio (Continued)

signal is determined. The sample of the reconstructed audio signal is determined based on the residual signal generated using the neural network for the sample of the audio signal.

39 Claims, 12 Drawing Sheets

(56) References Cited

U.S. PATENT DOCUMENTS

| | | | | |
|---|---|---|---|---|
| 6,691,082 | B1* | 2/2004 | Aguilar | G10L 19/0208 |
| | | | | 704/219 |
| 10,381,020 | B2 | 8/2019 | Ramprashad | |
| 2002/0069052 | A1* | 6/2002 | Chen | G10L 19/04 |
| | | | | 704/E19.023 |
| 2003/0101051 | A1* | 5/2003 | Raj | G10L 19/00 |
| | | | | 704/E15.047 |
| 2006/0293045 | A1* | 12/2006 | LaDue | H04L 1/0014 |
| | | | | 455/423 |
| 2018/0075343 | A1* | 3/2018 | van den Oord | G06N 3/0454 |
| 2019/0236451 | A1* | 8/2019 | Jaitly | G06N 3/0454 |
| 2019/0341067 | A1* | 11/2019 | Rajendran | G10L 25/12 |
| 2020/0411018 | A1* | 12/2020 | Chakravarty | G10L 21/007 |
| 2021/0005208 | A1* | 1/2021 | Beack | G10L 19/0204 |

OTHER PUBLICATIONS

Eunwoo S., et al., "ExcitNet Vocoder: A Neural Excitation Model for Parametric Speech Synthesis Systems", 2019 27th European Sihnal Processing Conference (EUSIPCO), EURASIP, Sep. 6, 2019 (Sep. 6, 2019), pp. 1-5, XP033660251, DOI: 10.23919/EUSIPC0. 2019.8902701 abstract figure 2(c) section III. B. Speech Synthesis Using ExcitNet Vocoder.

International Search Report and Written Opinion—PCT/US2020/040179—ISA/EPO—dated Oct. 9, 2020.

Yang G., et al., "A Robust and Fast DP-CELP (double-pulse CELP) Vocoder at the Bit Rate of 4 kb/s", Speech, Image Processing and Neural Networks, 1994, Proceedings, ISSIP NN 194., 1994 International Symposium on Hong Kong Apr. 13-16, 1994, New York, NY, USA, IEEE, Apr. 13, 1994 (Apr. 13, 1994), pp. 563-566, XP010121444, ISBN: 978-0-7803-1865-6 figure 1 section 2. The 4 kb/s DP-CELP Vocoder.

* cited by examiner

900

GENERATE, USING A NEURAL NETWORK, A RESIDUAL SIGNAL FOR AT LEAST ONE SAMPLE OF AN AUDIO SIGNAL BASED ON ONE OR MORE INPUTS TO THE NEURAL NETWORK, THE RESIDUAL SIGNAL BEING CONFIGURED TO EXCITE AT LEAST ONE OF A LONG-TERM PREDICTION FILTER AND A SHORT-TERM PREDICTION FILTER
902

DETERMINE, USING AT LEAST ONE OF THE LONG-TERM PREDICTION FILTER AND THE SHORT-TERM PREDICTION FILTER, AT LEAST ONE SAMPLE OF A RECONSTRUCTED AUDIO SIGNAL, THE AT LEAST ONE SAMPLE OF THE RECONSTRUCTED AUDIO SIGNAL BEING DETERMINED BASED ON THE RESIDUAL SIGNAL GENERATED USING THE NEURAL NETWORK FOR THE AT LEAST ONE SAMPLE OF THE AUDIO SIGNAL
904

GENERATE, USING THE NEURAL NETWORK, A LONG-TERM LINEAR PREDICTION (LTP) RESIDUAL FOR AT LEAST ONE SAMPLE OF AN AUDIO SIGNAL BASED ON ONE OR MORE INPUTS, THE LTP RESIDUAL BEING CONFIGURED TO EXCITE AN LTP FILTER
1002

DETERMINE, USING THE LTP FILTER, A LINEAR PREDICTION (LP) RESIDUAL FOR THE AT LEAST ONE SAMPLE OF THE AUDIO SIGNAL, THE LP RESIDUAL FOR THE AT LEAST ONE SAMPLE BEING DETERMINED BASED ON THE LTP RESIDUAL FOR THE AT LEAST ONE SAMPLE AND AN LTP PREDICTION OF THE AT LEAST ONE SAMPLE DETERMINED USING A GAIN AND AN LP RESIDUAL OF AT LEAST ONE PREVIOUS SAMPLE OF THE AUDIO SIGNAL
1004

DETERMINE, USING A SHORT-TERM LINEAR PREDICTION (LP) FILTER, AT LEAST ONE SAMPLE OF A RECONSTRUCTED AUDIO SIGNAL, THE AT LEAST ONE SAMPLE OF THE RECONSTRUCTED AUDIO SIGNAL BEING DETERMINED BASED ON AN LP PREDICTION AND THE LP RESIDUAL FOR THE AT LEAST ONE SAMPLE OF THE AUDIO SIGNAL
1006

FIG. 10

ARTIFICIAL INTELLIGENCE BASED AUDIO CODING

CROSS-REFERENCE TO RELATED APPLICATIONS

This application claims priority to Greek Application No. 20190100387, filed Sep. 9, 2019, which is hereby incorporated by reference, in its entirety and for all purposes.

FIELD

This application is related to voice coding. For example, systems and methods are described for performing artificial intelligence based voice coding.

BACKGROUND

Voice coding (also referred to as audio coding and/or speech coding) is a technique used to represent a digitized audio signal using as few bits as possible (thus compressing the speech data), while attempting to maintain a certain level of audio quality. A voice encoder is used to encode (or compress) the digitized audio (e.g., speech, music, etc.) signal to a lower bit-rate stream of data. The lower bit-rate stream of data can be input to a voice decoder, which decodes the stream of data and constructs an approximation or reconstruction of the original signal. The voice encoder-decoder structure can be referred to as a voice coder (or speech coder or audio coder) or a voice/speech/audio coder-decoder (codec).

Voice coders exploit the fact that speech signals are highly correlated waveforms. Some speech coding techniques are based on a source-filter model of speech production, which assumes that the vocal cords are the source of spectrally flat sound (an excitation signal), and that the vocal tract acts as a filter to spectrally shape the various sounds of speech. The different phonemes (e.g., vowels, fricatives, and voice fricatives) can be distinguished by their excitation (source) and spectral shape (filter).

SUMMARY

Techniques and systems are described herein for providing an artificial intelligence based audio coder (e.g., voice coder, music coder, or other type of audio coder). In some examples, an audio decoder can utilize a neural network model to decode certain portions of an audio signal. Examples of audio signals include speech or voice signals, music signals, and/or other sound signals. While some examples described herein use speech or voice signals as examples, the techniques described herein can be used for any type of audio signals.

In some implementations, the voice codec can include a code-excited linear prediction (CELP) codec or an algebraic-CELP (ACELP) codec. A CELP model is based on a source-filter model of speech production, which uses a linear prediction (LP) model to model the vocal tract, and entries of a fixed codebook (FCB) as input to the LP model. For instance, long-term linear prediction can be used to model pitch of a speech signal, and short-term linear prediction can be used to model the spectral shape (phoneme) of the speech signal. Entries in the FCB are based on coding of a residual signal that remains after the long-term and short-term linear prediction modeling is performed. The most bit-hungry stage of a CELP-based codec is the FCB, based on the brute-force coding of the residual signal, without attempting to model that signal.

The techniques and systems described herein include replacing the FCB of a conventional voice decoder with an artificial intelligence model, such as a neural network model. For example, a neural network model can be trained to act as a model of the residual signal that includes speech components not captured by the long-term and short-term linear prediction models. In such an example, an output of the neural network model includes a residual signal that can be used to excite the long-term linear prediction model or the short-term linear prediction model. Using the residual signal, the voice signal can be reconstructed by the long-term and short-term linear prediction models.

In some cases, by utilizing a neural network in a voice decoder to model the residual signal, a voice codec is provided that is suitable for applications and/or devices that have low bit-rate, complexity, and/or memory constraints. For instance, as compared to the FCB in conventional voice codes, the neural network model requires much fewer bits for residual coding.

Other techniques are also provided herein for improving voice coding.

According to at least one example, a method of reconstructing one or more audio signals is provided. The method includes generating, using a neural network, a residual signal for at least one sample of an audio signal based on one or more inputs to the neural network. The residual signal is configured to excite at least one of a long-term prediction filter and a short-term prediction filter. The method further comprises determining, using at least one of the long-term prediction filter and the short-term prediction filter, at least one sample of a reconstructed audio signal. The at least one sample of the reconstructed audio signal is determined based on the residual signal generated using the neural network for the at least one sample of the audio signal.

In another example, an apparatus for reconstructing one or more audio signals is provided that includes a memory configured to store audio data, and one or more processors implemented in circuitry and coupled to the memory. In some examples, the one or more processors are configured to generate, using a neural network, a residual signal for at least one sample of an audio signal based on one or more inputs to the neural network. The residual signal is configured to excite at least one of a long-term prediction filter and a short-term prediction filter. The one or more processors are further configured to determine, using at least one of the long-term prediction filter and the short-term prediction filter, at least one sample of a reconstructed audio signal. The at least one sample of the reconstructed audio signal is determined based on the residual signal generated using the neural network for the at least one sample of the audio signal.

In another example, a computer-readable storage medium storing instructions that when executed cause one or more processors of a device for reconstructing one or more audio signals to: generate, using a neural network, a residual signal for at least one sample of an audio signal based on one or more inputs to the neural network, the residual signal being configured to excite at least one of a long-term prediction filter and a short-term prediction filter; and determine, using at least one of the long-term prediction filter and the short-term prediction filter, at least one sample of a reconstructed audio signal, the at least one sample of the reconstructed audio signal being determined based on the residual signal generated using the neural network for the at least one sample of the audio signal.

In another example, an apparatus for reconstructing one or more audio signals is provided. The apparatus includes means for generating, using a neural network, a residual signal for at least one sample of an audio signal based on one or more inputs to the neural network. The residual signal is configured to excite at least one of a long-term prediction filter and a short-term prediction filter. The apparatus further includes means for determining, using at least one of the long-term prediction filter and the short-term prediction filter, at least one sample of a reconstructed audio signal. The at least one sample of the reconstructed audio signal is determined based on the residual signal generated using the neural network for the at least one sample of the audio signal.

In some aspects, the long-term prediction filter is a long-term linear prediction (LTP) filter. In some cases, the residual signal includes a long-term linear prediction (LTP) residual configured to excite the LTP filter.

In some examples, the methods, apparatuses, and computer-readable media described above can comprise: determining, using the LTP filter, a linear prediction (LP) residual for the at least one sample of the audio signal, the LP residual for the at least one sample of the audio signal being determined based on the LTP residual generated using the neural network for the at least one sample of the audio signal and an LTP prediction for the at least one sample of the audio signal determined using a gain and an LP residual of at least one previous sample of the audio signal. In some aspects, the gain is applied to the LP residual of the at least one previous sample of the audio signal.

In some aspects, the short-term prediction filter is a short-term linear prediction (LP) filter. In some examples, the methods, apparatuses, and computer-readable media described above can comprise: determining, using the short-term LP filter, the at least one sample of the reconstructed audio signal, the at least one sample of the reconstructed audio signal being determined based on an LP prediction and the LP residual determined for the at least one sample of the audio signal. In some examples, the one or more inputs to the neural network include at least one of the LTP prediction for the at least one sample of the audio signal, the LP prediction for the at least one sample of the audio signal, a previous LTP residual determined by the neural network for the at least one previous sample of the audio signal, and at least one previous sample of the reconstructed audio signal.

In some examples, the LTP residual generated using the neural network for the at least one sample of the audio signal is combined with the LTP prediction for the at least one sample of the audio signal to generate the LP residual for the at least one sample of the audio signal.

In some examples, the LP residual determined for the at least one sample of the audio signal is combined with the LP prediction of the at least one sample of the audio signal to determine the at least one sample of the reconstructed audio signal.

In some aspects, the short-term prediction filter is a short-term linear prediction (LP) filter. In some examples, the residual signal includes a linear prediction (LP) residual configured to excite the short-term LP filter. In some examples, the methods, apparatuses, and computer-readable media described above can comprise: determining, using the short-term LP filter, a long-term linear prediction (LTP) residual for the at least one sample of the audio signal, the LTP residual for the at least one sample being determined based on an LP prediction for the at least one sample of the audio signal and the LP residual generated using the neural network.

In some examples, the long-term prediction filter is a long-term linear prediction (LTP) filter. In some examples, the methods, apparatuses, and computer-readable media described above can comprise: determining, using the LTP filter, the at least one sample of the reconstructed audio signal, the at least one sample of the reconstructed audio signal being determined based on the LTP residual for the at least one sample of the audio signal and an LTP prediction of the at least one sample of the audio signal determined using a gain and at least one previous sample of the reconstructed audio signal.

In some aspects, the at least one sample of the audio signal includes a single sample.

In some aspects, the at least one sample of the audio signal includes a plurality of samples. In some examples, the plurality of samples are included in a frame of the audio signal.

In some aspects, the audio signal includes a speech signal, and the reconstructed audio signal includes a reconstructed speech signal. In some examples, the audio signal includes a music signal, and the reconstructed audio signal includes a reconstructed music signal.

The above-described aspects relating to any of the methods, apparatuses, and computer-readable media can be used individually or in any suitable combination.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures:

FIG. 9 is a flow chart illustrating an example of a process for reconstructing one or more audio signals, in accordance with some examples;

FIG. 10 is a flow chart illustrating an example of a process for reconstructing one or more audio signals, in accordance with some examples.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As noted above, techniques and systems are described herein for providing an artificial intelligence based audio coder. In some examples, an audio decoder can utilize a neural network model to decode certain portions of an audio signal. While some examples described herein use speech signals or voice signals as examples, the techniques described herein can be used for any type of audio signals, such as music signals and/or other sound signals.

Figure 1:
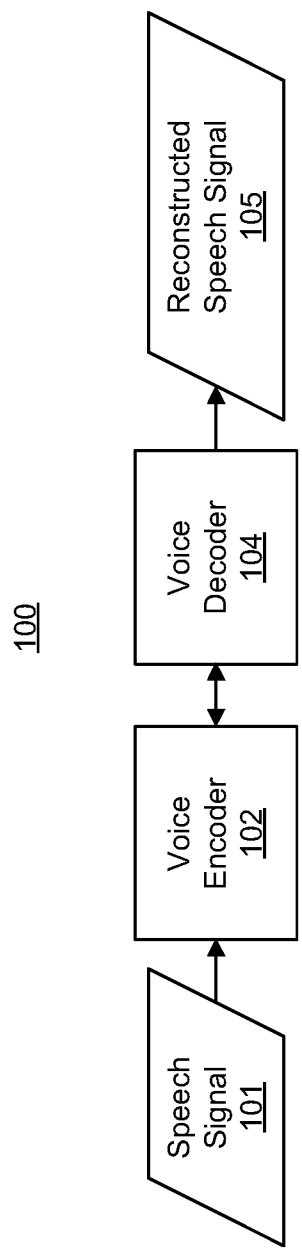
FIG. 1 is a block diagram illustrating an example of a voice coding system, in accordance with some examples.

Audio coding (e.g., speech coding, music signal coding, or other type of audio coding) can be performed on a digitized audio signal (e.g., a speech signal) to compress the amount of data for storage, transmission, and/or other use. FIG. 1 is a block diagram illustrating an example of a voice coding system 100 (which can also be referred to as a voice or speech coder or a voice coder-decoder (codec)). A voice encoder 102 of the voice coding system 100 can use a voice coding algorithm to process a speech signal 101. The speech signal 101 can include a digitized speech signal generated from an analog speech signal from a given source. For instance, the digitized speech signal can be generated using a filter to eliminate aliasing, a sampler to convert to discrete-time, and an analog-to-digital converter for converting the analog signal to the digital domain. The resulting digitized speech signal (e.g., speech signal 101) is a discrete-time speech signal with sample values (referred to herein as samples) that are also discretized.

Using the voice coding algorithm, the voice encoder 102 can generate a compressed signal (including a lower bit-rate stream of data) that represents the speech signal 101 using as few bits as possible, while attempting to maintain a certain quality level for the speech. The voice encoder 102 can use any suitable voice coding algorithm, such as a linear prediction coding algorithm (e.g., Code-excited linear prediction (CELP), algebraic-CELP (ACELP), or other linear prediction technique) or other voice coding algorithm.

The voice encoder 102 attempts to reduce the bit-rate of the speech signal 101. The bit-rate of a signal is based on the sampling frequency and the number of bits per sample. For instance, the bit-rate of a speech signal can be determined as follows:

$$BR = S * b,$$

Where BR is the bit-rate, S is the sampling frequency, and b is the number of bits per sample. In one illustrative example, at a sampling frequency (S) of 8 kilohertz (kHz) and at 16 bits per sample (b), the bit-rate of a signal would be a bit-rate of 128 kilobits per second (kbps).

The compressed speech signal can then be sent to and processed by a voice decoder 104. In some examples, the voice decoder 104 can communicate with the voice encoder 102, such as to request speech data, send feedback information, and/or provide other communications to the voice encoder 102. In some examples, the voice encoder 102 or a channel encoder can perform channel coding on the compressed speech signal before the compressed speech signal is sent to the voice decoder 104. For instance, channel coding can provide error protection to the bitstream of the compressed speech signal to protect the bitstream from noise and/or interference that can occur during transmission on a communication channel.

The voice decoder 104 decodes the data of the compressed speech signal and constructs a reconstructed speech signal 105 that approximates the original speech signal 101. The reconstructed speech signal 105 includes a digitized, discrete-time signal that can have the same bit-rate as that of the original speech signal 101. The voice decoder 104 can use an inverse of the voice coding algorithm used by the voice encoder 102, which as noted above can include any suitable voice coding algorithm, such as a linear prediction coding algorithm (e.g., CELP, ACELP, or other suitable linear prediction technique) or other voice coding algorithm. In some cases, the reconstructed speech signal 105 can be converted to continuous-time analog signal, such as by performing digital-to-analog conversion and anti-aliasing filtering.

Voice coders can exploit the fact that speech signals are highly correlated waveforms. The samples of an input speech signal can be divided into blocks of N samples each, where a block of N samples is referred to as a frame. In one illustrative example, each frame can be 10-20 milliseconds (ms) in length.

Code-excited linear prediction (CELP) is one example of a voice coding algorithm. The CELP model is based on a source-filter model of speech production, which assumes that the vocal cords are the source of spectrally flat sound (an excitation signal), and that the vocal tract acts as a filter to spectrally shape the various sounds of speech. The different phonemes (e.g., vowels, fricatives, and voice fricatives) can be distinguished by their excitation (source) and spectral shape (filter).

In general, CELP uses a linear prediction (LP) model to model the vocal tract, and uses entries of a fixed codebook (FCB) as input to the LP model. For instance, long-term linear prediction can be used to model pitch of a speech signal, and short-term linear prediction can be used to model the spectral shape (phoneme) of the speech signal. Entries in the FCB are based on coding of a residual signal that remains after the long-term and short-term linear prediction modeling is performed. For example, long-term linear prediction and short-term linear prediction models can be used for speech synthesis, and a fixed codebook (FCB) can be searched during encoding to locate the best residual for input to the long-term and short-term linear prediction models. The FCB provides the residual speech components not captured by the short-term and long-term linear prediction models. A residual, and a corresponding index, can be selected at the encoder based on an analysis-by-synthesis process that is performed to choose the best parameters so as to match the original speech signal as closely as possible. The index can be sent to the decoder, which can extract the corresponding LTP residual from the FCB based on the index.

Figure 2:
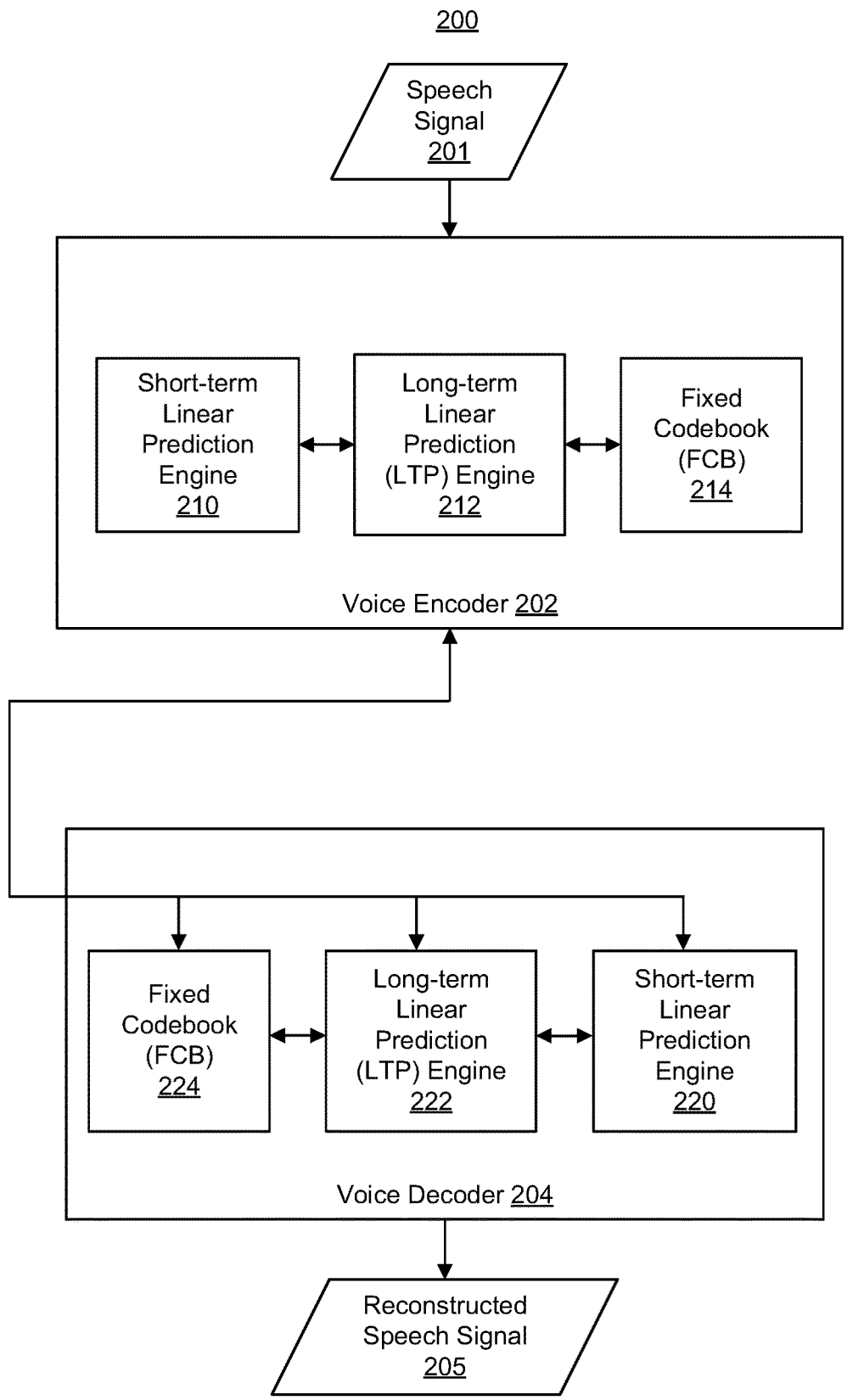
FIG. 2 is a block diagram illustrating an example of a CELP-based voice coding system utilizing a fixed codebook (FCB), in accordance with some examples.

FIG. 2 is a block diagram illustrating an example of a CELP-based voice coding system 200, including a voice encoder 202 and a voice decoder 204. The voice encoder 202 can obtain a speech signal 201 and can segment the samples of the speech signal into frames and sub-frames. For instance, a frame of N samples can be divided into sub-frames. In one illustrative example, a frame of 240 samples can be divided into four sub-frames each having 60 samples. For each frame, sub-frame, or sample, the voice encoder 202 chooses the parameters (e.g., gain, filter coefficients or linear prediction (LP) coefficients, etc.) for a synthetic speech signal so as to match as much as possible the synthetic speech signal with the original speech signal.

The voice encoder 202 can include a short-term linear prediction (LP) engine 210, a long-term linear prediction (LTP) engine 212, and a fixed codebook (FCB) 214. The short-term LP engine 210 models the spectral shape (phoneme) of the speech signal. For example, the short-term LP engine 210 can perform a short-term LP analysis on each frame to yield linear prediction (LP) coefficients. In some examples, the input to the short-term LP engine 210 can be the original speech signal or a pre-processed version of the original speech signal. In some implementations, the short-term LP engine 210 can perform linear prediction for each frame by estimating the value of a current speech sample based on a linear combination of past speech samples. For example, a speech signal s(n) can be represented using an autoregressive (AR) model, such as $s(n)=\sum_{k=1}^{m} a_k s(n-k)+\hat{e}(n)$, where each sample is represented as a linear combination of the previous m samples plus a prediction error term e(n). The weighting coefficients $a_1$, $a_2$, through $a_m$ are referred to as the LP coefficients. The prediction error term ê(n) can be found as follows: $\hat{e}(n)=s(n)-\sum_{k=1}^{m} a_k s(n-k)$. By minimizing the mean square prediction error with respect to the filter coefficients, the short-term LP engine 210 can obtain the LP coefficients. The LP coefficients can be used to form an analysis filter:

$$A(z) = 1 - \sum_{k=1}^{m} a_k z^{-k}$$
$$= 1 - P(z).$$

The short-term LP engine 210 can solve for P(z) (which can be referred to as a transfer function) by computing the LP coefficients ($a_k$) that minimize the error in the above AR model equation (s(n)) or other error metric. In some implementations, the LP coefficients can be determined using a Levinson-Durbin method, a Leroux-Gueguen algorithm, or other suitable technique. In some examples, the voice encoder 202 can send the LP coefficients to the voice decoder 204. In some examples, the voice decoder 204 can determine the LP coefficients, in which case the voice encoder 202 may not send the LP coefficients to the voice decoder 204. In some examples, Line Spectral Frequencies (LSFs) can be computed instead of or in addition to LP coefficients.

The LTP engine 212 models the pitch of the speech signal. Pitch is a feature that determines the spacing or periodicity of the impulses in a speech signal. For example, speech signals are generated when the airflow from the lungs is periodically interrupted by movements of the vocal cords. The time between successive vocal cord openings corresponds to the pitch period. The LTP engine 212 can be applied to each frame or each sub-frame of a frame after the short-term LP engine 210 is applied to the frame. The LTP engine 212 can predict a current signal sample from a past sample that is one or more pitch periods apart from a current sample (hence the term "long-term"). For instance, the current signal sample can be predicted as $p_r(n)=g_p r(n-T)$, where T denotes the pitch period, $g_p$ denotes the pitch gain, and r(n−T) denotes an LP residual for a previous sample one or more pitch periods apart from a current sample. Pitch period can be estimated at every frame. By comparing a frame with past samples, it is possible to identify the period in which the signal repeats itself, resulting in an estimate of the actual pitch period. The LTP engine 212 can be applied separately to each sub-frame.

The FCB 214 can include a number (denoted as L) of long-term linear prediction (LTP) residuals. An LTP residual includes the speech signal components that remain after the long-term and short-term linear prediction modeling is performed. The LTP residuals can be, for example, fixed or adaptive and can contain deterministic pulses or random noise (e.g., white noise samples). The voice encoder 202 can pass through the number L of LTP residuals in the FCB 214 a number of times for each segment (e.g., each frame or other group of samples) of the input speech signal, and can calculate an error value (e.g., a mean-squared error value) after each pass. The LTP residuals can be represented using codevectors. The length of each codevector can be equal to the length of each sub-frame, in which case a search of the FCB 214 is performed once every sub-frame. The LTP residual providing the lowest error can be selected by the voice encoder 202. The voice encoder 202 can select an index corresponding to the LTP residual selected from the FCB 214 for a given sub-frame or frame. The voice encoder 202 can send the index to the voice decoder 204 indicating which LTP residual is selected from the FCB 214 for the given sub-frame or frame. A gain associated with the lowest error can also be selected, and send to the voice decoder 204.

The voice decoder 204 includes an FCB 224, an LTP engine 222, and a short-term LP engine 220. The FCB 224 has the same LTP residuals (e.g., codevectors) as the FCB 214. The voice decoder 204 can extract an LTP residual from the FCB 224 using the index transmitted to the voice decoder 204 from the voice encoder 202. The extracted LTP residual can be scaled to the appropriate level and filtered by the LTP engine 222 and the short-term LP engine 220 to generate a reconstructed speech signal 205. The LTP engine 222 creates periodicity in the signal associated with the fundamental pitch frequency, and the short-term LP engine 220 generates the spectral envelope of the signal.

Other linear predictive-based coding systems can also be used to code voice signals, including enhanced voice services (EVS), adaptive multi-rate (AMR) voice coding systems, mixed excitation linear prediction (MELP) voice coding systems, linear predictive coding-10 (LPC-10), among others.

A voice codec for some applications and/or devices (e.g., Internet-of-Things (IoT) applications and devices) is required to deliver higher quality coding of speech signals at low bit-rates, with low complexity, and with low memory requirements. There are currently no known voice codecs that satisfy all of the requirements simultaneously. Existing linear predictive-based codecs cannot meet such requirements. For example, ACELP-based coding systems provide high quality, but do not provide low bit-rate or low complexity/low memory. Other linear-predictive coding systems provide low bit-rate and low complexity/low memory, but do not provide high quality.

With respect to CELP-based coding systems, the most bit-hungry stage is the FCB. Entries in the FCB are based on coding of a residual signal that remains after the long-term and short-term linear prediction modeling is performed. For instance, Algebraic Pulse Coding is performed on the residual signal that remains after short-term and long-term linear predictions are performed, without attempting to model the residual signal. The residual signal is a high-entropy signal, and brute-force, model-free quantization of the high-entropy signal results in a bit hungry FCB stage.

Systems, apparatuses, methods (also referred to as processes), and computer-readable media are described herein that replace the FCB of a conventional voice decoder with an artificial intelligence model, such as a neural network model. The other functional blocks of the voice decoder (e.g., the long-term linear prediction filter or engine and the short-term linear prediction filter or engine) can be based on conventional approaches (neural network modeling of the long-term and short-term linear prediction filters will not be performed). For example, the FCB of a conventional voice decoder can be replaced with an artificial intelligence model (e.g., a neural network model), while the other components of a conventional voice decoder (e.g., short-term linear prediction engine and a long-term linear prediction engine) are not replaced by a neural network. Advantages provided by the voice coding systems described herein over existing voice codecs make such systems well-suited for various types of applications, for example including mobile (smartphone, etc.), retail (point-of-service (POS), etc.), security, smart cities/buildings, wearables, industrial IoT, IoT space applications in general, among others.

Figure 3:
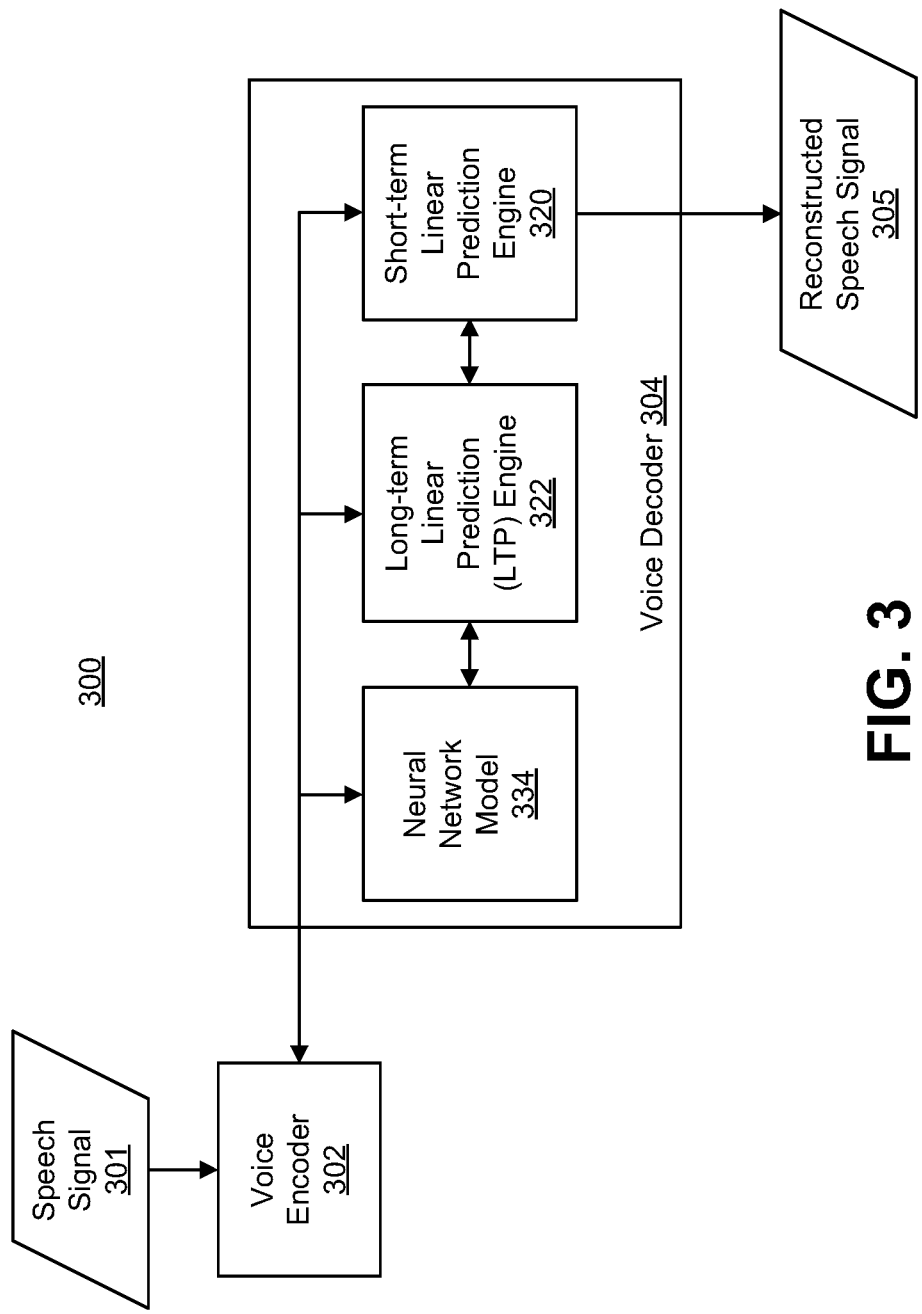
FIG. 3 is a block diagram illustrating an example of a voice coding system utilizing a neural network model, in accordance with some examples.

FIG. 3 is a diagram illustrating an example of a voice coding system 300 utilizing a neural network model. The voice coding system 300 includes a voice encoder 302 and a voice decoder 304. The voice encoder 302 can be similar to and can perform some or all of the functions of the voice encoder 202 described above. For example, the voice encoder 302 can include a short-term LP engine, an LTP engine, and an FCB (not shown). The voice encoder 302 can extract (and in some cases quantize) a set of features (referred to as a feature set) from the speech signal 301, and can send the extracted (and in some cases quantized) feature set to the voice decoder 304. The features that are computed by the voice encoder 302 can depend on a particular encoder implementation used. Various illustrative examples of feature sets are provided below according to different encoder implementations, which can be extracted by the voice encoder 302 (and in some cases quantized), and sent to the voice decoder 304. However, one of ordinary skill will appreciate that other feature sets can be extracted by the voice encoder 302. For example, the voice encoder 302 can extract any set of features, can quantize that feature set, and can send the feature set to the voice decoder 304.

As noted above, various combinations of features can be extracted as a feature set by the voice encoder 302. For example, a feature set can include one or any combination of the following features: Linear Prediction (LP) coefficients; Line Spectral Pairs (LSPs); Line Spectral Frequencies (LSFs); pitch lag with integer or fractional accuracy; pitch gain; pitch correlation; Mel-scale frequency cepstral coefficients (also referred to as mel cepstrum) of the speech signal; Bark-scale frequency cepstral coefficients (also referred to as bark cepstrum) of the speech signal; Mel-scale frequency cepstral coefficients of the LTP residual; Bark-scale frequency cepstral coefficients of the LTP residual; a spectrum (e.g., Discrete Fourier Transform (DFT) or other spectrum) of the speech signal; and/or a spectrum (e.g., DFT or other spectrum) of the LTP residual.

For any one or more of the other features listed above, the voice encoder 302 can use any estimation and/or quantization method, such as an engine or algorithm from any suitable voice codec (e.g. EVS, AMR, or other voice codec) or a neural network-based estimation and/or quantization scheme (e.g., convolutional or fully-connected (dense) or recurrent Autoencoder, or other neural network-based estimation and/or quantization scheme). The voice encoder 302 can also use any frame size, frame overlap, and/or update rate for each feature. Examples of estimation and quantization methods for each example feature are provided below for illustrative purposes, where other examples of estimation and quantization methods can be used by the voice encoder 302.

As noted above, one example of features that can be extracted from a voice signal by the voice encoder 302 includes LP coefficients and/or LSFs. Various estimation techniques can be used to compute the LP coefficients and/or LSFs. For example, as described above with respect to FIG. 2, the voice encoder 302 can estimate LP coefficients (and/or LSFs) from a speech signal using the Levinson-Durbin algorithm. In some examples, the LP coefficients and/or LSFs can be estimated using an autocovariance method for LP estimation. In some cases, the LP coefficients can be determined, and an LP to LSF conversion algorithm can be performed to obtain the LSFs. Any other LP and/or LSF estimation engine or algorithm can be used, such as an LP and/or LSF estimation engine or algorithm from an existing codec (e.g., EVS, AMR, or other voice codec).

Various quantization techniques can be used to quantize the LP coefficients and/or LSFs. For example, the voice encoder 302 can use a single stage vector quantization (SSVQ) technique, a multi-stage vector quantization (MSVQ), or other vector quantization technique to quantize the LP coefficients and/or LSFs. In some cases, a predictive or adaptive SSVQ or MSVQ (or other vector quantization technique) can be used to quantize the LP coefficients and/or LSFs. In another example, an autoencoder or other neural network based technique can be used by the voice encoder 302 to quantize the LP coefficients and/or LSFs. Any other LP and/or LSF quantization engine or algorithm can be used, such as an LP and/or LSF quantization engine or algorithm from an existing codec (e.g., EVS, AMR, or other voice codec).

Another example of features that can be extracted from a voice signal by the voice encoder 302 includes pitch lag (integer and/or fractional), pitch gain, and/or pitch correlation. Various estimation techniques can be used to compute the pitch lag, pitch gain, and/or pitch correlation. For example, the voice encoder 302 can estimate the pitch lag, pitch gain, and/or pitch correlation (or any combination thereof) from a speech signal using any pitch lag, gain, correlation estimation engine or algorithm (e.g. autocorrelation-based pitch lag estimation). For example, the voice encoder 302 can use a pitch lag, gain, and/or correlation estimation engine (or algorithm) from any suitable voice codec (e.g. EVS, AMR, or other voice codec). Various quantization techniques can be used to quantize the pitch lag, pitch gain, and/or pitch correlation. For example, the voice encoder 302 can quantize the pitch lag, pitch gain, and/or pitch correlation (or any combination thereof) from a speech signal using any pitch lag, gain, correlation quantization engine or algorithm from any suitable voice codec (e.g. EVS, AMR, or other voice codec). In some cases, an autoencoder or other neural network based technique can be used by the voice encoder 302 to quantize the pitch lag, pitch gain, and/or pitch correlation features.

Another example of features that can be extracted from a voice signal by the voice encoder 302 includes the Mel cepstrum coefficients and/or Bark cepstrum coefficients of the speech signal, and/or the Mel cepstrum coefficients and/or Bark cepstrum coefficients of the LTP residual. Various estimation techniques can be used to compute the Mel cepstrum coefficients and/or Bark cepstrum coefficients. For example, the voice encoder 302 can use a Mel or Bark frequency cepstrum technique that includes Mel or Bark frequency filterbanks computation, filterbank energy computation, logarithm application, and discrete cosine transform (DCT) or truncation of the DCT. Various quantization techniques can be used to quantize the Mel cepstrum coefficients and/or Bark cepstrum coefficients. For example, vector quantization (single stage or multistage) or predictive/adaptive vector quantization can be used. In some cases, an autoencoder or other neural network based technique can be used by the voice encoder 302 to quantize the Mel cepstrum coefficients and/or Bark cepstrum coefficients. Any other suitable cepstrum quantization methods can be used.

Another example of features that can be extracted from a voice signal by the voice encoder 302 includes the spectrum of the speech signal and/or the spectrum of the LTP residual. Various estimation techniques can be used to compute the spectrum of the speech signal and/or the LTP residual. For example, a Discrete Fourier transform (DFT), a Fast Fourier Transform (FFT), or other transform of the speech signal can be determined. Quantization techniques that can be used to quantize the spectrum of the voice signal can include vector quantization (single stage or multistage) or predictive/adaptive vector quantization. In some cases, an autoencoder or other neural network based technique can be used by the voice encoder 302 to quantize the spectrum. Any other suitable spectrum quantization methods can be used.

As noted above, any one of the above-described features or any combination of the above-described features can be estimated, quantized, and sent by the voice encoder 302 to the voice decoder 304 depending on the particular encoder implementation that is used. In one illustrative example, the voice encoder 302 can estimate, quantize, and send LP coefficients, pitch lag with fractional accuracy, pitch gain, and pitch correlation. In another illustrative example, the voice encoder 302 can estimate, quantize, and send LP coefficients, pitch lag with fractional accuracy, pitch gain, pitch correlation, and the Bark cepstrum of the speech signal. In another illustrative example, the voice encoder 302 can estimate, quantize, and send LP coefficients, pitch lag with fractional accuracy, pitch gain, pitch correlation, and the spectrum (e.g., DFT, FFT, or other spectrum) of the speech signal. In another illustrative example, the voice encoder 302 can estimate, quantize, and send pitch lag with fractional accuracy, pitch gain, pitch correlation, and the Bark cepstrum of the speech signal. In another illustrative example, the voice encoder 302 can estimate, quantize, and send pitch lag with fractional accuracy, pitch gain, pitch correlation, and the spectrum (e.g., DFT, FFT, or other spectrum) of the speech signal. In another illustrative example, the voice encoder 302 can estimate, quantize, and send LP coefficients, pitch lag with fractional accuracy, pitch gain, pitch correlation, and the Bark cepstrum of the LTP residual. In another illustrative example, the voice encoder 302 can estimate, quantize, and send LP coefficients, pitch lag with fractional accuracy, pitch gain, pitch correlation, and the spectrum (e.g., DFT, FFT, or other spectrum) of the LTP residual.

The voice decoder 304 includes a neural network model 334, an LTP engine 322, and a short-term LP engine 320. The neural network model 334 replaces the FCB of a conventional voice decoder. The LTP engine 322 and the short-term LP engine 320 can perform similar functions as those described above with respect to the LTP engine 222 and the short-term LP engine 220. While the voice decoder 304 in FIG. 3 and the examples described herein (e.g., in FIG. 5A-FIG. 8) are described as including both an LTP engine (e.g., LTP engine 322) and a short-term LP engine (e.g., short-term LP engine 320), the voice decoders described herein may include only an LTP engine (and not a short-term LP engine) or may include only a short-term LP engine (and not an LTP engine). For instance, in some implementations when only an LTP engine (and no short-term LP engine) is included in the voice decoder, the data typically provided by the short-term LP engine can be provided as input to the voice decoder (e.g., from the voice encoder). In another example, in some implementations when only a short-term LP engine (and no LTP engine) is included in the voice decoder, the data typically provided by the LTP engine can be provided as input to the voice decoder (e.g., from the voice encoder). Further, while the examples described herein (e.g., in FIG. 3 and FIG. 5A-FIG. 8) are described as including linear prediction filters (e.g., short-term LP engine 320 and LTP engine 322), the voice decoders and/or voice encoders described herein can include long-term and short-term prediction filters other than linear prediction filters.

The neural network model 334 can include any neural network architecture that can be trained to model the residual data that is typically represented by the data in an FCB. The residual data generated by the neural network model 334 (e.g., the LTP residual $\hat{e}(n)$ shown in FIG. 5A or the linear prediction (LP) residual $\hat{r}(n)$ shown in FIG. 5B) can be used to excite an LTP filter of the LTP engine 322 and/or a short-term prediction filter of the short-term LP engine 320. In one illustrative example, the neural network model 334 is a generative model (e.g., a probabilistic model, where the network does not directly output sample values, but instead outputs a probability distribution for a next sample value). In some implementations, the output domain can include q-bit (e.g., 8-bit) mu-law encoded speech, which can reduce the number of possible output sample values (e.g., to 256). In such implementations, the output of the neural network model 334 can be a probability distribution over the 256 possible mu-law indices (8-bit=$2^8$=256 possible values). The output distribution can be sampled and converted from mu-law to the linear domain to produce a speech sample.

Figure 4:
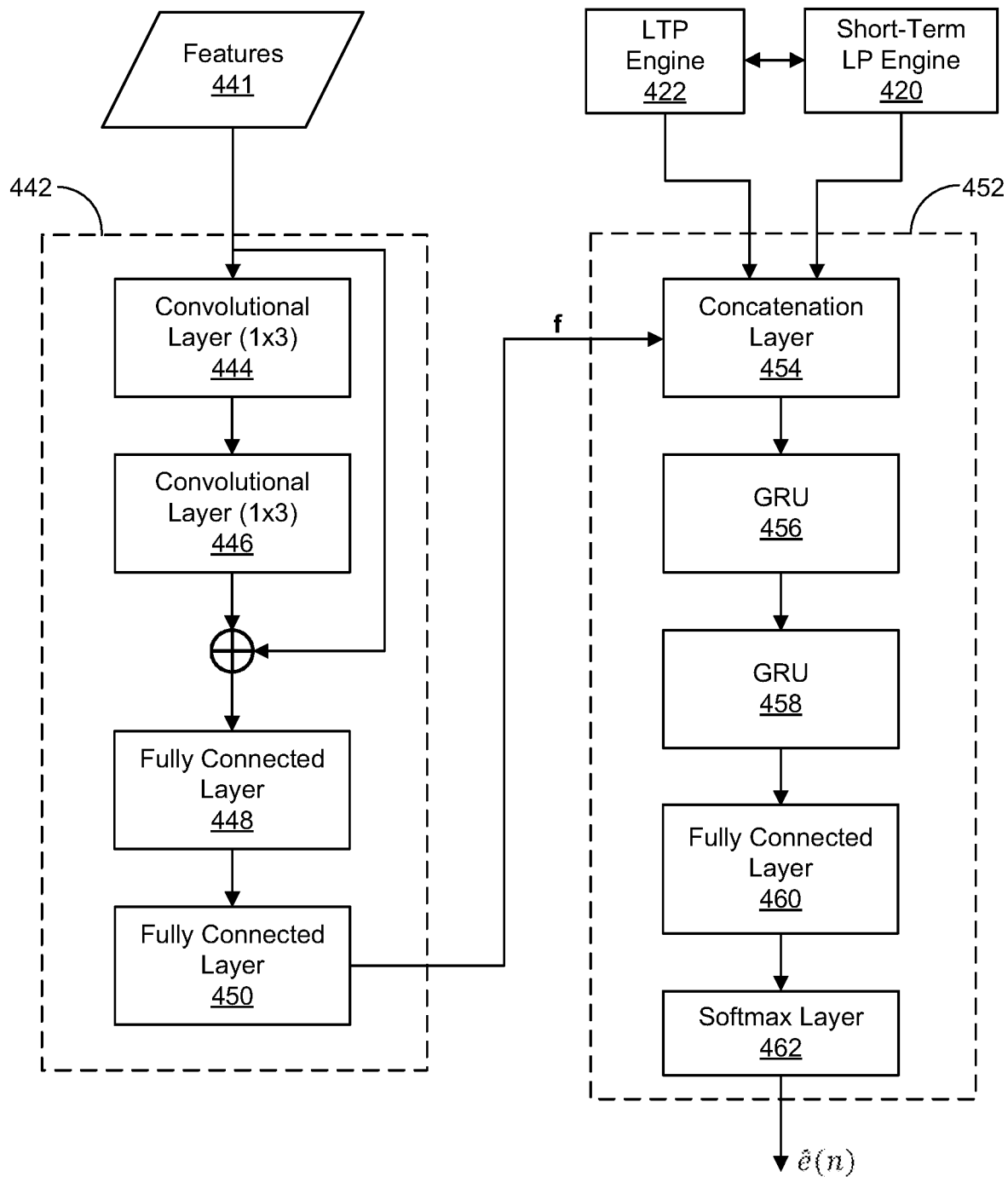
FIG. 4 is a block diagram illustrating an example of a neural network model, in accordance with some examples.

In some examples, the neural network model 334 can include two networks, including a frame rate network and a sample rate network. FIG. 4 is a diagram illustrating one illustrative example of a neural network model 434 including a frame rate network 442 and a sample rate network 452.

One of ordinary skill will appreciate that the neural network model 334 can include any other suitable network architecture. In one illustrative example, the frame rate network 442 processes 10-ms frames (e.g., 160 samples), and the sample rate network 452 operates at 16 kHz. The features 441 can be input to the frame rate network 442. The feature set included in the features 441 can include any set of features (in some cases quantized features and in other cases dequantized features) received from the voice encoder 302. The features included in the feature set can depend on the encoder that is used. Any of the above-described illustrative example combination of the above-described features can be used. In one of the illustrative examples provided above, the features computed and quantized by the voice encoder 302 can include LP coefficients, pitch lag with fractional accuracy, pitch gain, pitch correlation, and the Bark cepstrum of a speech signal. In such an example, the features 441 that are input to the frame rate network 442 can include 18-coeffiecient Bark-scale cepstral coefficients of the speech signal, an integer pitch period (or lag) (e.g., between 16 and 256 samples), a fractional pitch period (or lag), and a pitch correlation (e.g., between 0 and 1). The features 441 can be provided for at least the last two frames of the speech signal before a current speech frame, the current speech frame, and the future two speech frames after the current speech frame.

The fractional pitch period can be used to maximize the efficiency of the LTP filter of the LTP engine 322. For example, the fractional pitch period can be used to minimize the LTP residual energy and correlation. When the fractional pitch period is used for the LTP filter, it can also be provided as an input to the neural network of the neural network model 334, to give the neural network additional information on how to produce an LTP residual best suited for the current target speech output. By using the fractional pitch period, the neural network of the neural network model 334 is able to predict a signal with minimal structure, which minimizes the network complexity.

For a codec structure that may replace the FCB and LTP operations with a neural network model, a fractional pitch period would not be used because such a codec structure does not have an LTP loop outside the neural network that needs to be optimized. Such a codec structure may only use a pitch period as a feature input to the neural network that replaces the FCB and LTP operations, and as such does not have to be as accurate. As noted above, the fractional pitch period can be used to optimize the performance of the LTP filter of the LTP engine 322, removing burden of LTP from the neural network, and the accurate pitch estimate provided by the fractional pitch period is beneficial.

As shown in FIG. 4, the frame rate network 442 includes a convolutional layer 444, a convolutional layer 446, a fully connected layer 448, and a fully connected layer 450. For example, the features 441 are input to the convolutional layer 444, and the output of the convolutional layer 444 is input to the convolutional layer 446. In some cases, the convolutional layer 444 and the convolutional layer 446 include filters of the same size. For example, the convolutional layer 444 and the convolutional layer 446 can include a filter size of 3, resulting in a receptive field of five frames (two frames ahead and two frames back, as noted above). The output of the convolutional layer 446 is added to feature data from features 441 and is then input to a fully connected layer 448. The output from the fully connected layer 448 is input to the fully connected layer 450. The frame rate network outputs the conditioning vector f that is then used by the sample rate network 452. In one illustrative example, the conditioning vector f is a 128-dimensional vector. The conditioning vector f can be held constant for the duration of each frame.

The sample rate network 452 includes a concatenation layer 454, a gated recurrent unit (GRU) 456, a GRU 458, combined fully connected layers 460, and a softmax layer 462. In some cases, a Long Short-Term Memory (LSTM) can be used in place of the GRU 456 and/or the GRU 458. The concatenation layer 454 can concatenate the conditioning vector f and outputs from the LTP engine 422 and the short-term LP engine 420. The outputs from the LTP engine 422 and the short-term LP engine 420 can vary depending on the implementation. Different examples of outputs from the LTP engine 422 and the short-term LP engine 420 are described below with respect to FIG. 5A-FIG. 8. For instance, as described below with respect to FIG. 5A, the input to the sample rate network 452 can include the previous-time-instant LTP residual $ê(n-1)$ of a previous sample (e.g., produced by the neural network model 334 or 434), the previous time-instant synthesized speech sample $ŝ(n-1)$, the LP prediction $p̂(n)$ of the current sample (e.g., generated by the short-term LP engine 320 or 420), the LTP prediction $p̂_r(n)$ of the current sample (e.g., generated by the LTP engine 322 or 422), and the conditioning vector f produced by the frame rate network 442. In some cases, as described below with respect to FIG. 6, the previous time-instant LP residual $r̂(n-1)$ (e.g., based on combining the LTP residual from the neural network model with the LTP prediction from the LTP engine) for the previous sample can be provided as additional input to the sample rate network 452. Providing as input the LTP prediction from the LTP engine 322 or 422 and the LTP residual provides feedback from the LTP engine 322 or 422, and providing as input the LP prediction provides feedback from the short-term LP engine 320 or 420. Using the inputs, the sample rate network 452 can generate or predict the current LTP residual $ê(n)$ for the current sample (or batch of samples as described below with respect to FIG. 9).

In some examples, the inputs to the sample rate network 452 can be mu-law encoded and embedded using an embedding layer (not shown). For instance, the embedding can map (e.g., in an embedding matrix) each mu-law level to a vector, essentially learning a set of non-linear functions to be applied to the mu-law value. The embedding matrix can be sent to the GRU 456 and/or to the GRU 458. For example, as shown in FIG. 4, the embedding matrix can be input to the GRU 456, and the output of the GRU 456 can be input to the GRU 458. In another example, the embedding matrix can be separately input to the GRU 456 and to the GRU 458. The product of the embedding matrices with the corresponding submatrices of the non-recurrent weights of the GRU 456 and GRU 458 can be computed. A transformation can be applied for all gates (u, r, h) of the GRU 456 and the GRU 458 and all of the embedded inputs (e.g., $ê(n-1)$, $ŝ(n-1)$, $p̂(n)$, $p̂_r(n)$, and/or f in some cases, one or more of these inputs may not be embedded, such as the conditioning vector f and/or other input). Using the previous time-instant synthesized speech sample $ŝ(n-1)$ as an example of an embedded input, E can denote the embedding matrix and $U^{(u,s)}$ can denote a submatrix of $U^{(n)}$ including the columns that apply to the embedding of the $ŝ(n-1)$ sample, and a new embedding matrix $V^{(u,s)}=U^{(u,s)}E$ can be derived that directly maps the sample $ŝ(n-1)$ to the non-recurrent term of the update gate computation.

The output from the GRU 458 (as shown in FIG. 4), or outputs from the GRU 456 and the GRU 458 when the embedding matrix is input separately to the GRU 456 and to the GRU 458, is provided to the fully connected layer 460. In some examples, the fully connected layer 460 can include two fully-connected layers combined with an element-wise weighted sum. Using the combined fully connected layers 460 can make it easier to compute the output probabilities without significantly increasing the size of the preceding layer. In one illustrative example, the combined fully connected layers 460 can be defined as $dual\_fc(x) = a_1 \cdot \tanh(W_1 x) + a_2 \cdot \tanh(W_2 x)$, where $W_1$ and $W_2$ are weight matrices, and $a_1$ and $a_2$ are weighting vectors. The output of the fully connected layer 460 is used with a softmax activation of a softmax layer 462 to compute the probability of each possible excitation value for an LTP residual $\hat{e}(n)$.

As shown in FIG. 4, the output of the sample rate network 452 is the LTP residual $\hat{e}(n)$ for the current sample (or batch of samples as described below with respect to FIG. 9). As described below, the LTP residual $\hat{e}(n)$ can be combined with the LTP prediction $\hat{p}_r(n)$ from the LTP engine 322 or 422 to generate an LP residual $\hat{r}(n)$. The LP residual $\hat{r}(n)$ can be combined with the output of the short-term LP engine 320 or 420 to generate the current time-instant synthesized speech sample $\hat{s}(n)$. The reconstructed speech signal 305 shown in FIG. 3 can include one or more time-instant synthesized speech samples.

The neural network models 334 and 434 can be trained using any suitable neural network training technique. One illustrative example will now be described with respect to the neural network model 434. However, one of ordinary skill will appreciate that other training techniques can be used to train the neural network models 334 and 434. The corresponding input-output pairs can be provided to the neural network model 334 for training. For example, for each time instant n, the input to the frame rate network 442 can include the 18-coefficient Bark cepstral coefficients, the pitch integer and fractional lags (or periods), and the pitch correlation for the past two speech frames before the current frame, the current speech frame, and the two subsequent frames after the current frame. In such an example, the input to the sample rate network 452 can include the previous-time-instant LTP residual $\hat{e}(n-1)$, the previous-time-instant speech sample $\hat{s}(n-1)$, the current LP prediction $\hat{p}(n)$, and the current LTP prediction $\hat{p}_r(n)$. The target output (or label or groundtruth) for the neural network model 434 can include the current LTP residual $\hat{e}(n)$.

Backpropagation can be performed to train the neural network model 434 using the inputs and the target output. Backpropagation can include a forward pass, a loss function, a backward pass, and a parameter update to update one or more parameters (e.g., weight, bias, or other parameter). The forward pass, loss function, backward pass, and parameter update are performed for one training iteration. The process can be repeated for a certain number of iterations for each set of inputs until the neural network model 434 is trained well enough so that the weights (and/or other parameters) of the various layers are accurately tuned.

While the voice coding system 300 is shown to include certain components, one of ordinary skill will appreciate that the voice coding system 300 can include more or fewer components than those shown in FIG. 3. For example, in some instances, the voice coding system 300 can also include one or more other memory components (e.g., one or more caches, buffers, RAMs, ROMs, and/or the like), storage components, display components, processing components, circuits, controllers, sensors, interfaces, ASICs (application-specific integrated circuits), etc., that are not shown in FIG. 3. Moreover, in some cases, the voice coding system 300 can be part of a computing system that can include one or more components, such as one or more wireless transceivers, one or more input devices (e.g., a touch screen, a keyboard, a mouse, an input sensor, etc.), one or more output devices (e.g., a display, a speaker, a projector, etc.), one or more storage devices, one or more other processing devices, etc., that are not shown in FIG. 3.

The voice coding system 300 can be part of or can be implemented by a computing device. In some implementations, the computing device can include an electronic device, such as a camera (e.g., a digital camera, a camera phone, a video phone, a tablet device with a built-in camera or other suitable capture device), a mobile or stationary telephone handset (e.g., smartphone, cellular telephone, or the like), a desktop computer, a laptop or notebook computer, a tablet computer, a head-mounted display (HIVID) or virtual reality headset, a heads-up display (HUD), a vehicle (e.g., an autonomous vehicle or a human-driven vehicle), a set-top box, a television, a display device, a digital media player, a video gaming console, a video streaming device, or any other suitable electronic device. In some cases, the computing device (or devices) can include one or more wireless transceivers for wireless communications.

In some examples, the voice encoder 302 can be part of a first computing device or computing system (e.g., a server device or system, a vehicle, or other computing device or system), and the voice decoder 304 can be part of a second computing device or computing system (e.g., a mobile handset, a desktop computer, or other computing device or system). The computing system including the voice encoder 302 and/or the computing system including the voice decoder 304 can include the computing system 1100 described below with respect to FIG. 11. The computing systems (or devices) can be in communication over any available communications networking using any available communication protocol. For example, the computing systems can include user communications interfaces that can perform or facilitate receipt and/or transmission of wired or wireless communications using wired and/or wireless transceivers (or separate receivers and transmitters). Various illustrative examples of input-output devices and communications protocols are provided below with respect to FIG. 11.

Figure 5A:
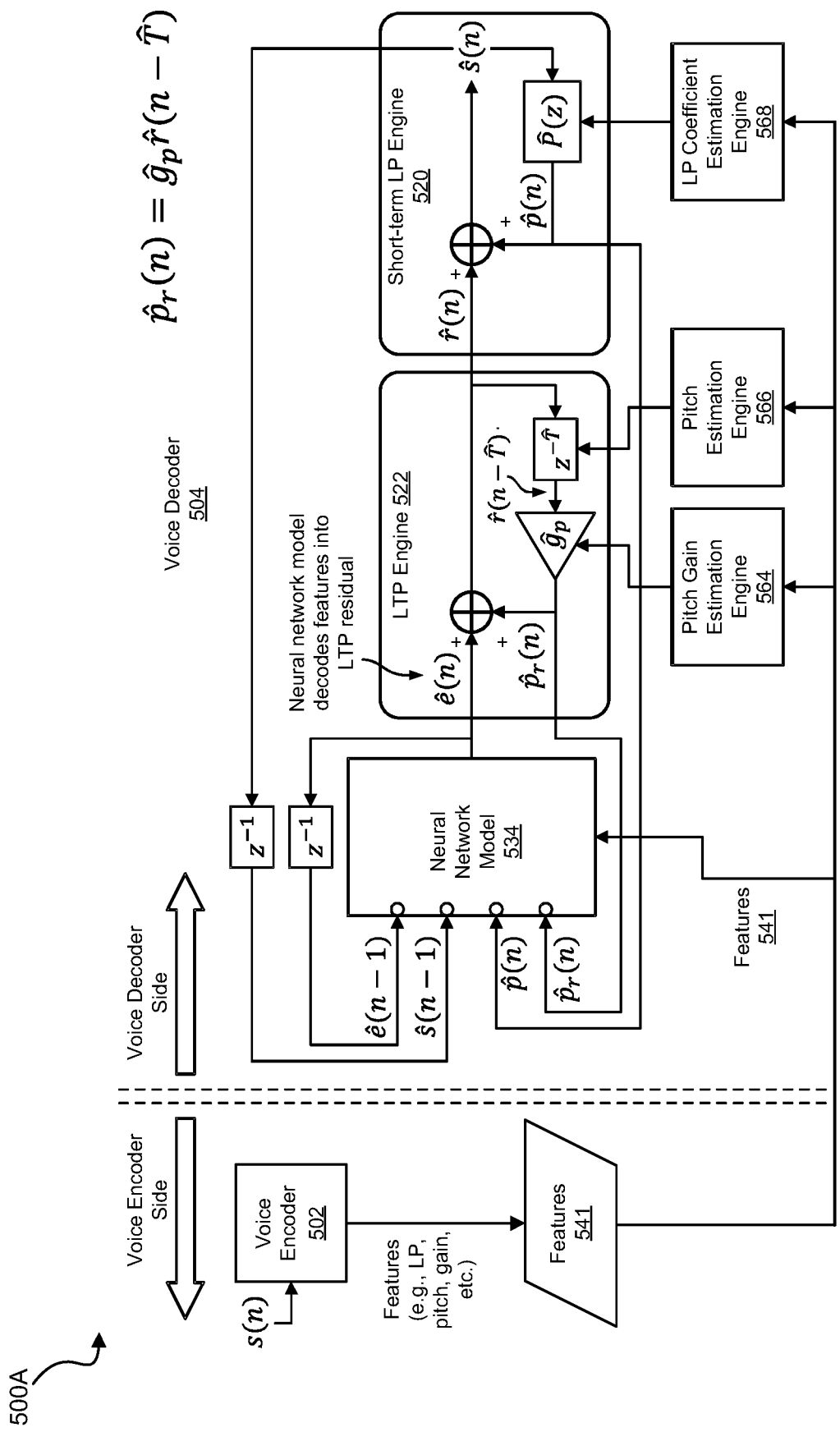
FIG. 5A is a block diagram illustrating another example of a voice coding system utilizing a neural network model, in accordance with some examples.

FIG. 5A is a block diagram illustrating an example of a voice coding system 500A that includes a voice encoder 502 and a voice decoder 504 that uses a neural network model for generating an LTP residual, which is typically provided using an FCB. The voice coding system 500A is an example of the voice coding system 300, and can perform some or all of the functions described above with respect to FIG. 3 and/or FIG. 4. The terms shown in FIG. 5A (and in FIG. 5B-FIG. 8) with hat symbols (e.g., residual $\hat{e}(n)$) are quantized values, and terms shown without a hat symbol are non-quantized values. In FIG. 5A (as well as in FIG. 5B-FIG. 9), the symbol $z^{-X}$ denotes an X sample delay element (e.g., $z^{-1}$ denotes a 1-sample delay). The backwards triangle is an amplifier with gain ($\hat{g}_p$) written inside of the triangle. A filter with transfer function $\hat{P}(z)$ is denoted by a rectangle with the transfer function ($\hat{P}(z)$) written inside of it.

As illustrated in FIG. 5A, the voice encoder 502 receives a voice signal s(n) and can extract features from the voice signal s(n). The features 541 can be sent to the voice decoder 504. As previously described, different feature sets can be determined, quantized, and sent by the voice encoder 502 to the voice decoder 504. For example, the voice encoder 502 can extract any set of features, can quantize that feature set, and can send the feature set to the voice decoder 504. In one illustrative example using one of the encoder implementations described above, the voice encoder 502 can estimate, quantize, and send LP coefficients, pitch lag (or period) with fractional accuracy, pitch gain, pitch correlation, and the Bark cepstral coefficients of the speech signal. However, one of ordinary skill will appreciate that other feature sets can be extracted by the voice encoder 502.

In some examples, for LP coefficient estimation, the voice encoder 502 can use the Levinson-Durbin algorithm. In one illustrative example, for integer pitch lag estimation, the voice encoder 502 can use the EVS codec Open-Loop (OL) pitch estimation algorithm. For example, the OL pitch analysis calculates three estimates of the pitch lag for each frame, which can be performed to smooth the pitch evolution contour and to simplify the pitch analysis by confining the closed-loop pitch search to a small number of lags around the open-loop estimated lags. The OL pitch estimation is based on a perceptually weighted pre-emphasized input signal. The open-loop pitch analysis is performed on a signal decimated by two (e.g., sampled at 6.4 kHz), which can reduce the computational complexity of the searching process. The decimated signal can be obtained by filtering the signal through a 5th-order finite impulse response (FIR) filter with certain coefficients (e.g., coefficients {0.13, 0.23, 0.28, 0.23, 0.13}) and then down-sampling the output by a factor (e.g., a factor of 2). The OL pitch analysis can be performed three times per frame to find three estimates of the pitch lag, including two in the current frame and one in a subsequent frame. The first two estimations are based on certain segments (e.g., 10-millisecond (ms) segments) of the current frame. The third estimation corresponds to the subsequent frame, and the length of this segment can be a certain duration (e.g., 8.75 ms). In some examples, the OL pitch estimate can be further refined using an autocorrelation-based method, such as the autocorrelation technique for open-loop pitch analysis described in the EVS coding Standard (e.g., 3GPP TS 26.445 version 12.0.0 Release 12, which is hereby incorporated by reference in its entirety and for all purposes).

In some examples, for fractional pitch lag estimation, the EVS codec fractional pitch estimation method can be used by the voice encoder 502. For example, the OL pitch can be further refined by maximizing the normalized correlation function with a fractional resolution around the pitch lag values $d^{[0]}$ and $d^{[1]}$ (in the 12.8-kHz sampling domain). The fractional open-loop pitch lag can be computed four times per frame (e.g., for each sub-frame of 64 samples). The maximum normalized correlation corresponding to the best fractional open-loop pitch lag can then be used in the classification of Voiced Coding (VC) frames (e.g., frames with high periodicity and smooth pitch contour). The fractional open-loop pitch search can be performed by first maximizing an autocorrelation function C of the perceptually weighted speech $s_h$ for integer lags in the interval $[d^{[i]}-7 \ldots d^{[i]}+6]$, where $d^{[i]}=d^{[0]}$ for the search in the first and the second sub-frames, and $d^{[i]}=d^{[1]}$ for the third and fourth sub-frames. An autocorrelation function similar to that used above for integer pitch lag estimation, except that perceptually weighted speech at 12.8 kHz sampling rate can be used. For example, the autocorrelation technique described in the EVS coding Standard for fractional open-loop pitch estimate can be used.

In another illustrative example, for integer and/or fractional pitch lag estimation, the voice encoder 502 can use the Enhanced Variable Rate Codec (EVRC) pitch estimation algorithm. For instance, the input to the delay estimate and long-term prediction gain calculation can include a short-term residual vector (denoted as $\{\varepsilon(n)\}$, and the outputs of the delay estimate and long-term prediction gain calculation can include the pitch delay estimate (denoted as $\tau$) and the long-term prediction gain (denoted as $\beta$). As part of initialization, the values of some or all local state variables and buffers can be set to zero at start-up. The pitch delay can be calculated using a technique described below. The pitch delay is the delay that maximizes the autocorrelation function (or other suitable function) of the short-term prediction residual signal, subject to certain constraints. The calculation of the pitch delay can be carried out independently over two estimation windows. The first estimation window can include the entire current frame, and the second estimation window can include the second half of the current frame and the look-ahead. Rules can then be applied to combine the delay estimates and gains for the two estimation windows.

The constrained search for the optimal delay in each window can be carried out for each of the two estimation windows of each frame. In some cases, a non-exhaustive open loop delay search can be performed, as described in the Third Generation Partnership Project 2 (3GPP2) Enhanced Variable Rate Codec (EVRC), Speech Service Codec Standard (e.g., 3GPP C.S0014-D, version 3.0, Sections 4.6.3.1, which is hereby incorporated by reference in its entirety and for all purposes). For instance, the residual signal, $\varepsilon(n)$, can be filtered and decimated by a factor of four (or other suitable value) to generate a decimated residual signal, $\{\varepsilon_d(n)\}$. In some cases, the decimated residual signal, $\{\varepsilon_d(n)\}$ can be generated by applying the following:

$$x(n)=\varepsilon(n+n_{start})+2.2875x(n-1)-1.956x(n-2)+0.5959x(n-3);$$

and:

$$\varepsilon_d(n')=\varepsilon_d(n'+20), 0 \leq n' \leq 20,$$

and:

$$\varepsilon_d(n')=x(4n'-77)-0.312[x(4n'-78)+x(4n'-79)]+x(4n'-80),$$

where $\{x(n)\}$ is the decimator filter memory, $\{\varepsilon_d(n)\}$ is the decimated residual buffer, and $n_{start}$ is 160 (or other suitable value) for the first estimation window and 240 (or other suitable value) for the second estimation window. The autocorrelation function of the decimated residual signal $\{\varepsilon_d(n)\}$ can be generated using the following:

$$r(d) = \sum_{k=0}^{40-d} \varepsilon_d(k)\varepsilon_d(k+d); 5 \leq d \leq 30.$$

The delay, $d_{max}$, corresponding to the maximum positive correlation, $r_{max}$, can then be found.

Other functions can also be performed, such as a refinement of open loop delay estimate (e.g., for a Service Option (SO) 3, SO 68, SO 70, and/or SO 73 speech codecs) determined using the non-exhaustive open loop delay search described above, a long-term prediction gain calculation, a smoothed delay estimate and LTP gain (e.g., for an SO 3, SO 68, SO 70, and/or SO 73 speech codecs), and/or composite delay and gain calculations (e.g., for an SO 3, SO 68, SO 70, and/or SO 73 speech codecs), such as those described in the 3GPP2 Enhanced Variable Rate Codec (EVRC), Speech Service Codec Standard (e.g., 3GPP C.S0014-D, version 3.0, Sections 4.6.3 through 4.6.3.8, which is hereby incorporated by reference in its entirety and for all purposes).

In some examples, for Bark cepstrum computation, the voice encoder 502 can use any suitable Bark cepstrum computation algorithm. For example, the Bark cepstrum can be computed from a number of Bark-spaced bands (e.g., 18 Bark-spaced bands). In some cases, the Bark cepstrum is computed once every pre-determined period of time (e.g., every 10 ms). In some implementations, quantization can be performed using a recurrent or non-recurrent convolutional autoencoder (neural network). In some cases, four cepstral vectors can be packed into each packet. In some implementations, a prediction scheme can be performed to minimize redundancy within a packet while limiting dependencies across packets, which can reduce the effect of packet loss. In one example, packet k can include cepstral vectors $c_{4k}$ to $c_{4k+3}$. The first component (C0) of $c_{4k+3}$ can be coded independently, with a uniform scalar quantizer (e.g., a 7-bit scalar quantizer with 0.83 dB resolution). The remaining components of $c_{4k+3}$ can then be coded independently using a codebook (e.g., a 3-stage codebook with 17 dimensions and 10 bits for each stage). The vector $c_{4k+1}$ can then be predictively coded using both $c_{4k+1}$ (independently coded in the previous packet) and $c_{4k+3}$. In some cases, a single bit can be used to signal if the prediction is the average $(c_{4k+1}+c_{4k+3}/2)$, or two bits if the prediction is either of $c_{4k+1}$ or $c_{4k+3}$. The 18-dimensional prediction residual can then be coded with an 11-bit+sign codebook for the average predictor or with a 10-bit+sign codebook if not, for a total of 13 bits for $c_{4k+1}$. In some cases, there is insufficient bitrate to adequately code $c_{4k}$ and $c_{4k+2}$, in which case a prediction from neighboring vectors can be used. For instance, vector $c_{4k}$ can be predicted from neighbors $c_{4k-1}$ and $c_{4k+1}$, and $c_{4k+2}$ can be predicted from $c_{4k+1}$ and $c_{4k+3}$.

While various illustrative examples of techniques are provided above for determining the various features, any other suitable techniques can be used to determine the features.

The voice encoder 502 can send the features 541 (e.g., after the features are quantized) to the voice decoder 504. The voice decoder 504 includes a neural network model 534, an LTP engine 522, and a short-term LP engine 520, which can be similar to the neural network model 334 (and in some cases the neural network model 434), the LTP engine 322, and the short-term LP engine 320 described above with respect to FIG. 3. In some cases, the neural network model 534 includes a frame rate network and a sample rate network, such as those described above with respect to FIG. 4.

The voice decoder 504 can also include a pitch gain estimation engine 564, a pitch estimation engine 566, and an LP coefficient estimation engine 568. For example, the pitch gain estimation engine 564, the pitch estimation engine 566, and the LP coefficient estimation engine 568 include algorithms for implicitly estimating those features from other encoder features, in the event the voice encoder 502 does not estimate and transmit one or more of those features explicitly. The pitch gain estimation engine 564, the pitch estimation engine 566, and the LP coefficient estimation engine 568 on the decoder side may be needed if the encoder implementation that was used does not transmit the pitch gain, the pitch estimation, and the LP coefficients explicitly, in which case these features can be implicitly estimated from other encoder features. For the encoder implementation described above that extracts, quantizes, and sends LP coefficients, pitch lag (or period) with fractional accuracy, pitch gain, pitch correlation, and the Bark cepstral coefficients of the speech signal, the LP and pitch parameters are transmitted explicitly, in which case the pitch gain estimation engine 564, the pitch estimation engine 566, and the LP coefficient estimation engine 568 are not needed in those implementations.

Based on other encoder implementations that may not transmit the LP coefficients or pitch parameters (e.g., gain, lag, period, etc.) explicitly, the pitch gain estimation engine 564, the pitch estimation engine 566, and the LP coefficient estimation engine 568 may be used to estimate those features. For instance, for the encoder implementation described above that extracts, quantizes, and sends pitch lag with fractional accuracy, pitch gain, pitch correlation, and the Bark cepstrum of the speech signal, the voice encoder does not send LP features explicitly. In such cases, the LP coefficient estimation engine 568 can be used by the voice decoder 504 to estimate LP coefficients from the Bark cepstrum of the speech signal that the encoder does transmit. In one illustrative example, the LP coefficients can be estimated from the Bark cepstrum of the speech signal by first converting the Bark-frequency cepstrum (e.g., the 18-band Bark-frequency cepstrum) into a linear-frequency power spectral density (PSD). The PSD can then be converted to an autocorrelation using an inverse FFT. From the auto-correlation, the Levinson-Durbin algorithm can be used to compute the LP coefficients. In cases when pitch is not transmitted explicitly by the voice encoder 502, the voice decoder 504 can use the pitch estimation engine 566 to derive the pitch from the speech spectrum.

The neural network model 534 generates an LTP residual $\hat{e}(n)$ by effectively decoding the input features into the LTP residual $\hat{e}(n)$. As shown in FIG. 5A, the input to the neural network model can include the LTP prediction $\hat{p}_r(n)$ (output from the LTP engine 522) and the LP prediction $\hat{p}(n)$ (output from the short-term LP engine 520) for a current sample n, the LTP residual $\hat{e}(n-1)$ for a previous sample n-1, and a previous sample $\hat{s}(n-1)$ of the synthesized speech signal. The features 541 sent by the voice encoder 502 and/or determined by one or more of the pitch gain estimation engine 564, the pitch estimation engine 566, and the LP coefficient estimation engine 568 can also be provided to the neural network model 534. Based on the input, the neural network model 534 can generate the LTP residual $\hat{e}(n)$ for the current sample n that produces the smallest error between the original signal s(n) and a synthesized (reconstructed) signal $\hat{s}(n)$.

The LTP residual $\hat{e}(n)$ output from the neural network model 534 can be used as input to the LTP engine 522 (and can be used for excitation of the LTP engine 522), as shown in FIG. 5A. In some examples, the LTP residual $\hat{e}(n)$ can be used as input to the short-term LP engine 520. As shown in FIG. 5A, the LTP residual $\hat{e}(n)$ is input to the LTP engine 522, along with pitch parameters (e.g., pitch period T and pitch gain $\hat{g}_p$) sent by the voice encoder 502 and/or derived by one or more of the pitch gain estimation engine 564, the pitch estimation engine 566, and the LP coefficient estimation engine 568. An LTP filter of the LTP engine 522 can model the pitch of a signal (where pitch is a feature that determines the spacing or periodicity of the impulses in a synthesized LP residual $\hat{r}(n)$), and thus produces the synthesized LP residual signal $\hat{r}(n)$ for the current sample n with the correct spacing of impulses. The LTP prediction $\hat{p}_r(n)$ of the current signal sample n is predicted from a previous sample that is one or more pitch periods apart, and the pitch gain $\hat{g}_p$ can be applied to the LP residual signal of a previous sample (e.g., an LP residual $\hat{r}(n-1)$ of a previous sample n-1 or any other previous sample n-2, n-3, and so on). For instance, the LTP prediction $\hat{p}_r(n)$ of the current sample n can be predicted as the pitch gain $\hat{g}_p$ times the LP residual $\hat{r}(n-T)$ of the previous sample n−T, where T is the pitch period, indicating to the LTP filter how far back to look and replicate the pulses. In one illustrative example, the following formulation can be used by the LTP engine 522 to determine the LTP prediction: $\hat{p}_r(n)=\hat{g}_p\hat{r}(n-T)$. The LTP prediction $\hat{p}_r(n)$ predicted by the LTP filter is combined (as illustrated by the "+" sign) with the LTP residual ê(n) from the neural network model 534 to generate the synthesized LP residual $\hat{r}(n)$ for the current sample n.

The synthesized LP residual $\hat{r}(n)$ output from the LTP engine 522 is provided to the short-term LP engine 520, which can include a short-term LP filter. The LP coefficients sent by the voice encoder 502 or determined by the LP coefficient estimation engine 568 can also be input to the short-term LP engine 520. A short-term LP filter of the short-term LP engine 520 can be used to model the spectral shape (or phenome or envelope) of the speech signal. For example, at the voice encoder 502, a signal x(n) can be filtered by an autoregressive (AR) process synthesizer to obtain an AR signal. As described above, a linear predictor can be used to predict the AR signal (where the predicted AR signal is the LP prediction $\hat{p}(n)$) as a linear combination of the previous m samples as follows:

$$\hat{P}(z) = \sum_{k=1}^{m} -\hat{a}_k z^{-k} = 1 - \hat{A}(z),$$

where the $\hat{a}_k$ terms ($\hat{a}_1, \hat{a}_2, \ldots \hat{a}_m$) are estimates of the AR parameters (also referred to as LP coefficients). The LP residual r(n) (also referred to as the prediction error) is the difference between the original AR signal and the predicted AR signal $\hat{p}(n)$ (and thus the difference between the actual sample and the predicted sample). At the voice encoder 502, the linear prediction coding is used to find the best LP coefficients for minimizing a quadratic error function, and thus the error. The short-term linear prediction process removes the short term correlation from the speech signal. The LP coefficients are an efficient way to represent the short term spectrum of the speech signal. At the voice decoder 504, the short-term LP filter determines the LP prediction $\hat{p}(n)$ for the current sample n using the computed or received LP coefficients and the transfer function $\hat{P}(z)$.

The final reconstructed (or predicted) signal $\hat{s}(n)$ can be determined as the sum of the synthesized LP residual $\hat{r}(n)$ output from the LTP engine 522 and the LP prediction $\hat{p}(n)$ (for the current sample n) determined by the short-term LP engine 520.

Figure 6:
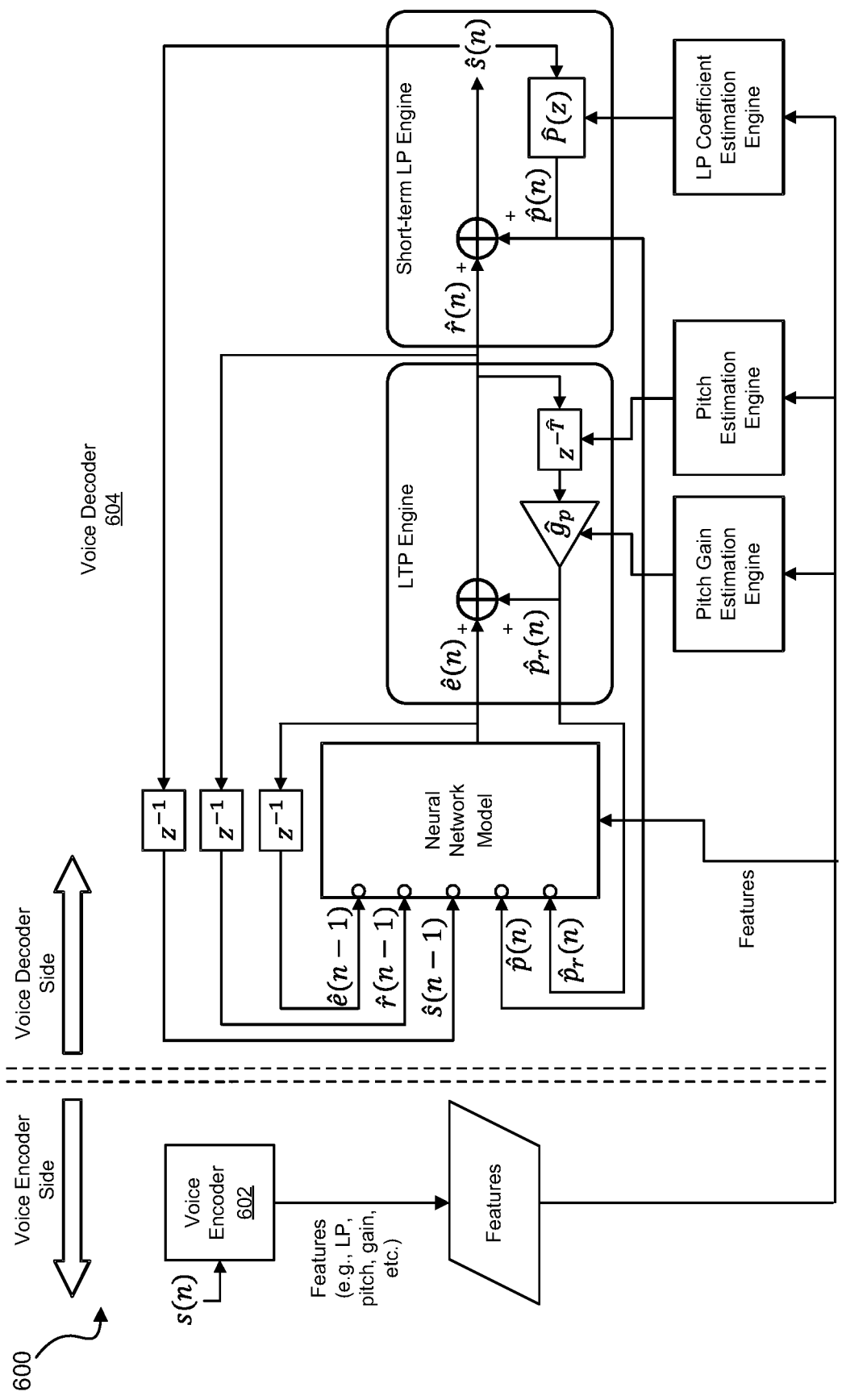
FIG. 6 is a block diagram illustrating another example of a voice coding system utilizing a neural network model, in accordance with some examples.

FIG. 6 is a block diagram illustrating another example of a voice coding system 600 that includes a voice encoder 602 and a voice decoder 604 that uses a neural network model for generating an LTP residual (typically provided using an FCB). The voice coding system 600 is similar to and can perform similar functions as the voice coding system 500A, and common components and functions are not repeated herein.

In addition to the functionality described above with respect to FIG. 5A, the previous-time-instant LP residual $\hat{r}(n-1)$ is provided as additional input to the neural network model. The previous-time-instant LP residual $\hat{r}(n-1)$ provides another parameter that can be used by the neural network model to provide a more accurate estimation of the LTP residual ê(n).

Figure 7:
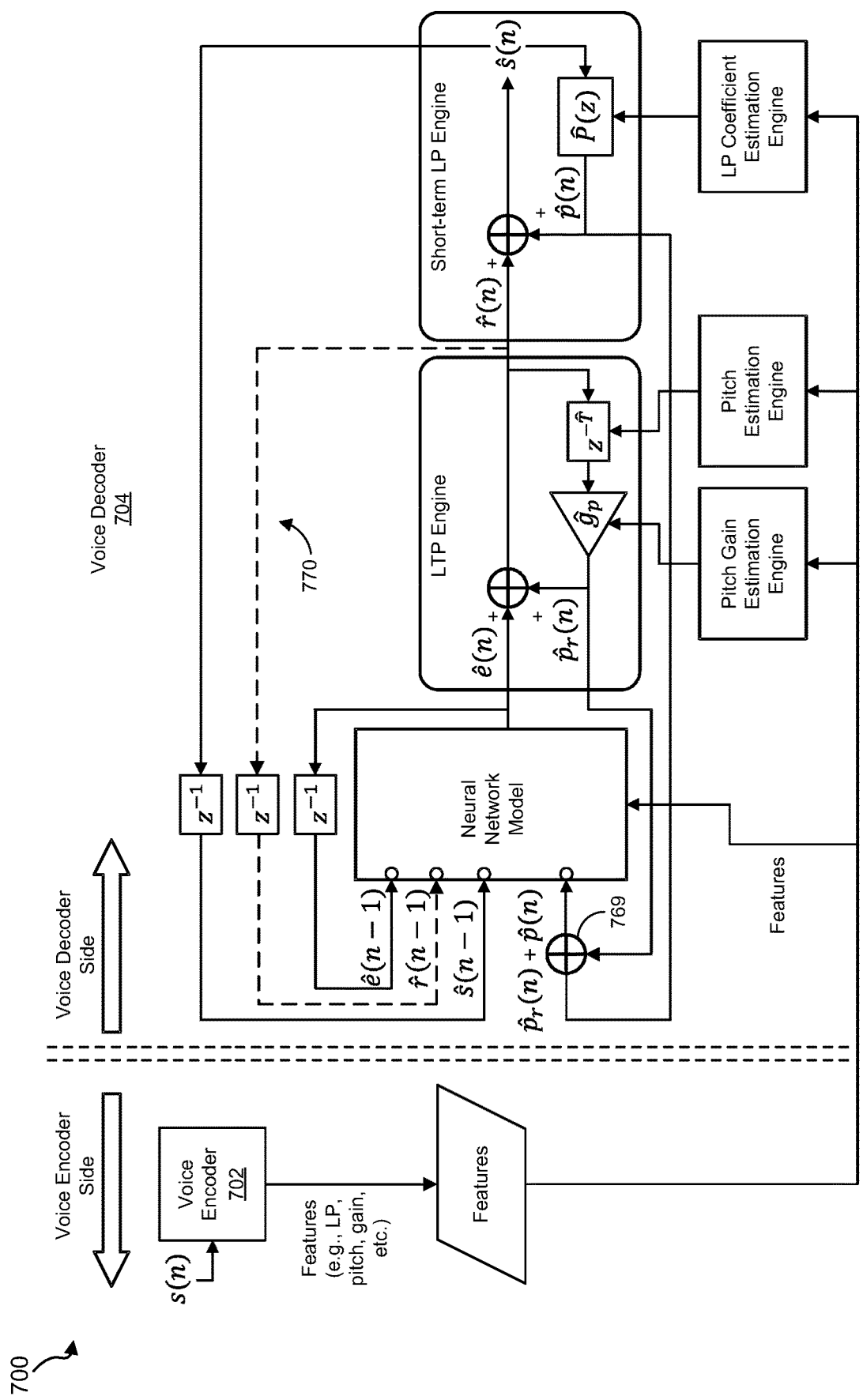
FIG. 7 is a block diagram illustrating another example of a voice coding system utilizing a neural network model, in accordance with some examples.

FIG. 7 is a block diagram illustrating another example of a voice coding system 700. Similar to the voice coding systems 500A (FIG. 5A) and 600 (FIG. 6), the voice coding system 700 includes a voice encoder 702 and a voice decoder 704 that uses a neural network model for generating an LTP residual. The voice coding system 700 is similar to and can perform similar functions as the voice coding system 500A, and common components and functions are not repeated herein.

In addition to the functionality described above with respect to FIG. 5A, the LTP prediction $\hat{p}_r(n)$ predicted by the LTP engine and the LP prediction $\hat{p}(n)$ predicted by the short-term LP engine are combined (as illustrated by the "+" sign 769). The summed-up LP and LTP predictions are input to the neural network model in the architecture shown in FIG. 7, rather than the two separate LP and LTP prediction inputs provided to the neural network models in the architectures shown in FIG. 5A and FIG. 6. In some cases, the combination of the LP and LTP prediction inputs can be used in the example shown in FIG. 5A (where the LP residual $\hat{r}(n-1)$ for the previous sample is not provided as additional input to the neural network model) and can also be used in the example shown in FIG. 6 (where the LP residual $\hat{r}(n-1)$ for the previous sample is provided as additional input to the neural network model), as indicated by the dashed line 770 shown in FIG. 7.

The example voice coding system architectures described above with respect to FIG. 5A and FIG. 6 operate sample-by-sample by producing a synthesized speech sample at each iteration. In some implementations, a voice coding system can be designed with a neural network model (e.g., a generative model) that performs batch generation, which can generate an entire frame of speech at once instead of generating sample-by-sample outputs. A batch generation alternative implementation would allow the addition of the LTP residual (e.g., ê(n)) and the LTP prediction (e.g., $\hat{p}_r(n)$) to happen in parallel for the whole frame.

Figure 8:
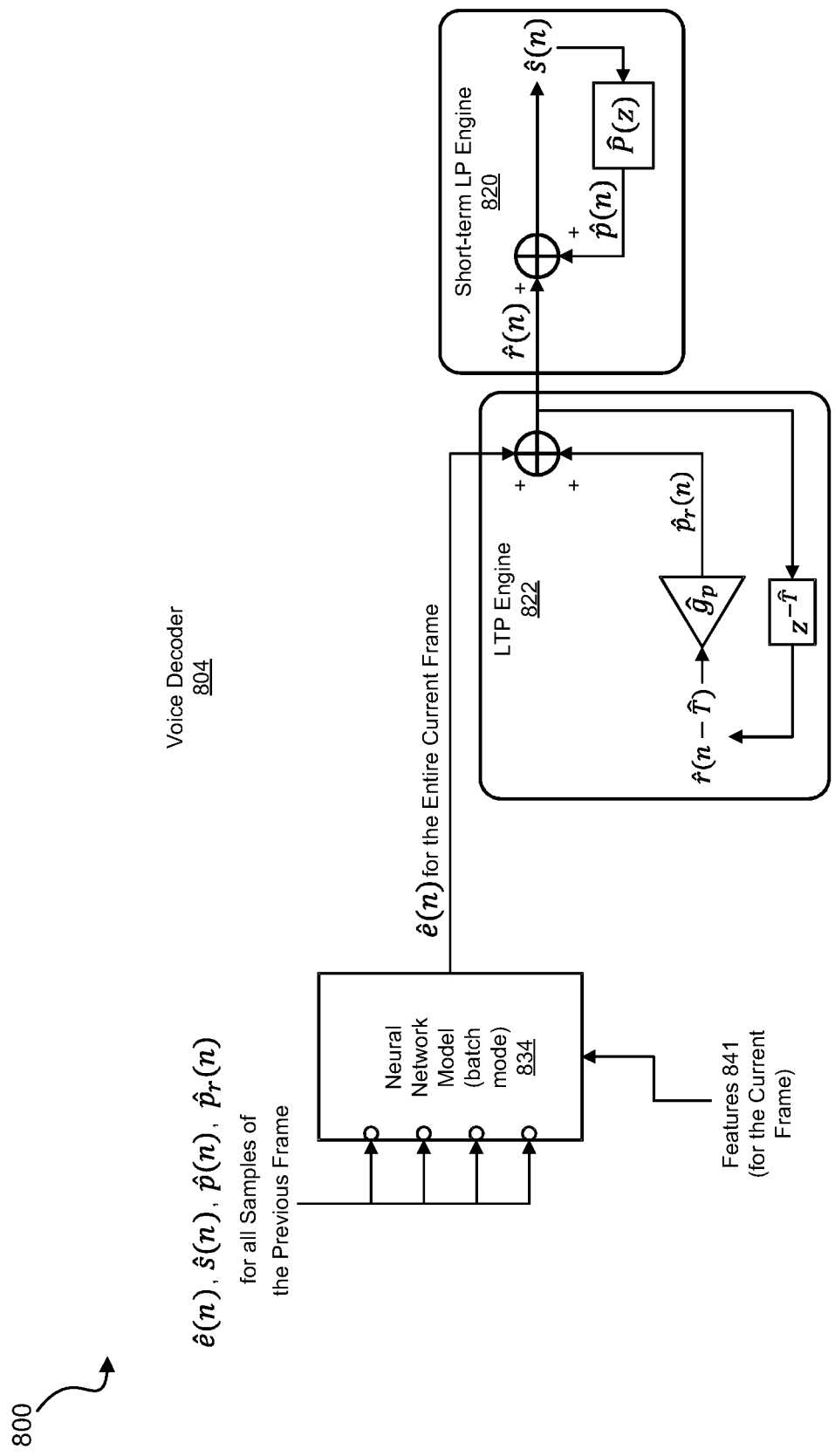
FIG. 8 is a block diagram illustrating an example of a neural network-based voice coding system that operates on a frame-by-frame basis, in accordance with some examples.

FIG. 8 is a diagram illustrating an example of a voice decoder 804 in a voice coding system 800 including a batch-generation neural network model 834. As shown, the inputs to the neural network model 834 include the LTP residual ê(n), the reconstructed signal $\hat{s}(n)$, the LP prediction $\hat{p}(n)$, and the LTP prediction $\hat{p}_r(n)$ for all samples of the previous frame. Features 841 for the current frame are also provided as input to the neural network model 834. The features 841 can include any of the feature sets described above. Some or all of the features 841 can be sent to the voice decoder 804 by a voice encoder (not shown) and/or can be determined by the voice decoder 804.

Using the provided inputs, the neural network model 834 generates an LTP residual ê(n) for the entire current speech frame. The LTP residual ê(n) is provided as input to the LTP engine 822. The LTP engine 822 can generate an LTP prediction $\hat{p}_r(n)$ for the entire frame using the LP residual $\hat{r}(n-T)$ of a previous frame and the pitch gain $\hat{g}_p$ (e.g., by computing $\hat{p}_r(n)=\hat{g}_p\hat{r}(n-T)$), as described above. The LTP engine 822 can combine the LTP prediction $\hat{p}_r(n)$ and the LTP residual ê(n) for the entire frame to generate the synthesized LP residual $\hat{r}(n)$ for the current frame.

The synthesized LP residual $\hat{r}(n)$ output from the LTP engine 822 is provided as input to the short-term LP engine 820. The short-term LP engine 820, using LP coefficients sent by the voice encoder or determined by the voice decoder 804, can determine the LP prediction $\hat{p}(n)$ for the frame using the transfer function $\hat{P}(z)$. The final reconstructed signal $\hat{s}(n)$ for the entire frame can be determined as the sum of the synthesized LP residual $\hat{r}(n)$ output from the LTP engine 822 and the LP prediction $\hat{p}(n)$ determined by the short-term LP engine 820.

Figure 5B:
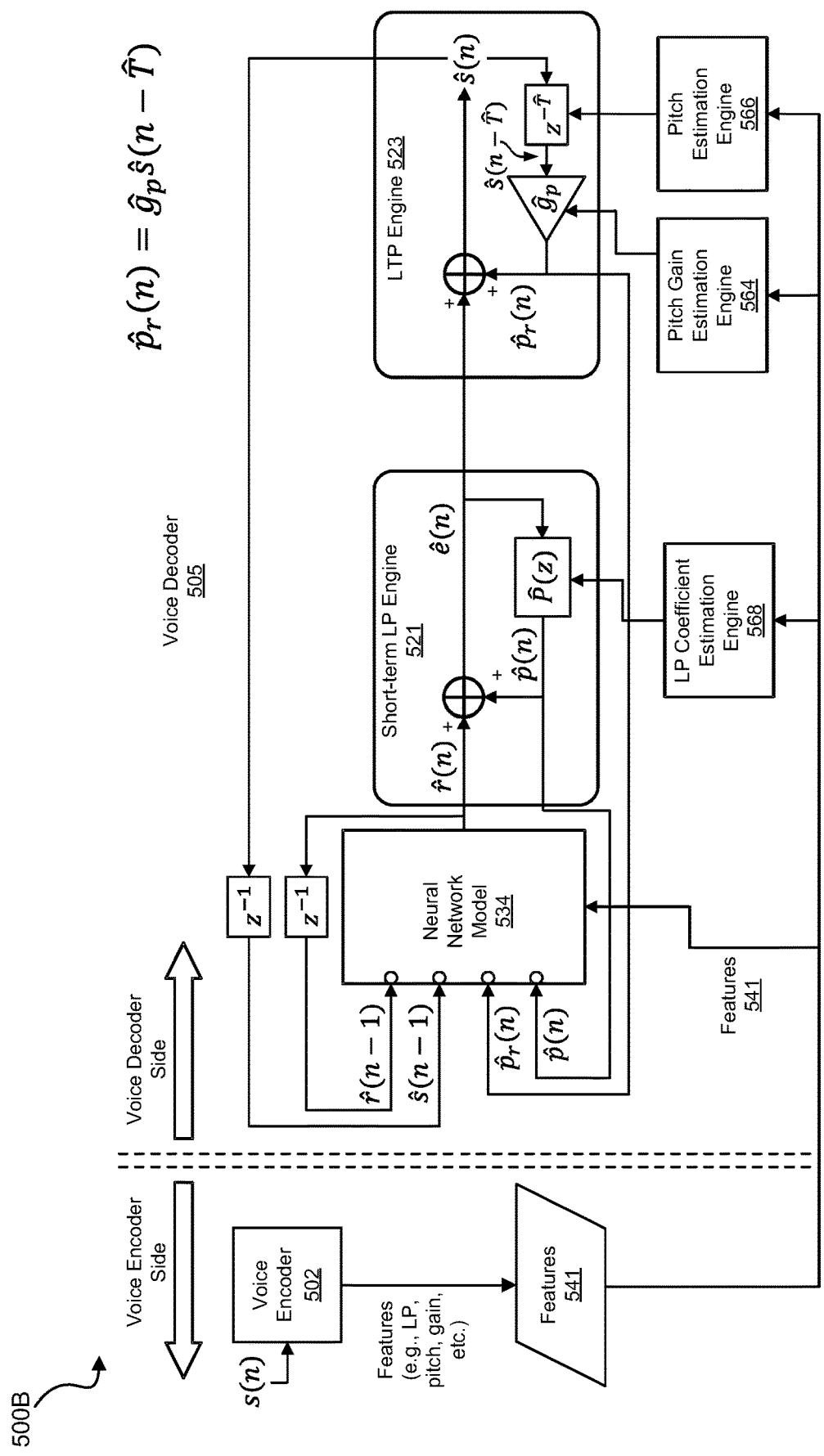
FIG. 5B is a block diagram illustrating another example of a voice coding system utilizing a neural network model, in accordance with some examples.

The example voice coding system architectures described above with respect to FIG. 5A-FIG. 8 are provided as examples for illustrative purposes. However, other coding system architectures can be used where the voice decoder includes a neural network model that generates an LTP residual. For instance, in some implementations, a voice decoder 505 can have the configuration shown in the voice coding system 500B of FIG. 5B, where the short-term LP engine (e.g., the short-term LP engine 520 or the like) and the LTP engine (e.g., LTP engine 522 or the like) are transposed as compared to the configuration of the voice decoder 504 shown in FIG. 5A. In the example shown in FIG. 5B, the output from the neural network model 534 is a residual signal that includes a linear prediction (LP) residual $\hat{r}(n)$ configured to excite the short-term LP filter of the short-term LP engine 521. In such implementations, the output of the short-term LP engine 521 is provided to the LTP engine 523. For example, the short-term LP filter of the short-term LP engine 521 can determine an LTP residual $\hat{e}(n)$ for a sample of a speech signal based on an LP prediction $\hat{p}(n)$ for the sample and an LP residual $\hat{r}(n)$ generated using the neural network model 534. The LTP filter of the LTP engine 523 can determine a sample $\hat{s}(n)$ of a reconstructed speech signal based on the LTP residual $\hat{e}(n)$ for the sample determined by the short-term LP filter of the short-term LP engine 521 and based on an LTP prediction $\hat{p}_r(n)$ of the sample. As shown in FIG. 5B, the LTP prediction $\hat{p}_r(n)$ can be determined by the LTP filter using a gain $\hat{g}_p$ and at least one previous sample of the reconstructed speech signal (e.g., $\hat{s}(n-T)$ of a previous sample n−T). In some examples, the neural network model (e.g., neural network model 534) can provide residual signals for both a short-term linear prediction engine (e.g., short-term LP engine 520 and/or short-term LP engine 521) and for an LTP engine (e.g., LTP engine 522 and/or LTP engine 523). In some examples, only one of a LTP engine and a short-term linear prediction engine can be used to determine at least a sample of a reconstructed audio signal.

In some examples, the neural network model can be of other types and architecture, and can accept other sets of inputs that may be different from those described above. A key part of any coding system architecture according to the examples provided herein is the existence of an LTP synthesis loop outside of the neural network model that generates the LTP residual that is then used by the LTP synthesis loop, which implies that the neural network model need only predict the LTP residual and not the LP residual or the speech signal directly. The LP residual and the speech signal have structures that are difficult for a neural network to model.

Using the neural network models described above to generate an LTP residual is advantageous for bit rate reduction because it eliminates the FCB stage of conventional CELP codecs, which is the most bit consuming stage of a CELP codec. The neural network based voice coding systems described above model the pitch components outside of the neural network model, in which case the encoder estimates and transmits pitch parameters (e.g., using the LTP engine at the voice encoder). In some examples, the quantization of pitch parameters can consume a large number of bits in conventional CELP-based codecs.

In some implementations, the pitch parameter estimation and quantization can be performed on the encoder side in a way that saves a significant number of bits. For example, a Relaxed code-excited linear prediction (RCELP) coding technique can be used along with the LTP residual generating neural network model for pitch parameter estimation, which can allow maximum bit savings (by removing the bit-hungry FCB stage and the bit-hungry pitch parameter quantization stage). RCELP does not attempt to match the original speech signal exactly. Instead of attempting to match the original residual signal, RCELP matches a time-warped version of the original residual that conforms to a simplified pitch contour. The pitch contour is obtained by estimating the pitch delay once in each frame and by linearly interpolating the pitch from frame to frame. Simplifying the pitch representation enables significant savings in pitch quantization, for instance by removing the need for fractional pitch and/or sub-frame pitch lag and gain updates.

The neural network model described above for generating LTP residuals acts as a model of the residual signal that is left over after LTP and short-term LP are performed on a signal, and does not perform the brute-force, model free quantizer that is performed for the FCB of typical CELP-based voice codecs. The neural network model requires a lot fewer (potentially 0) bits for residual coding, addressing the low bit-rate requirement of various target applications (e.g., IoT, among others).

Other advantages are also provided in comparison to conventional codecs and over other novel Machine-Learning (ML) based codecs using the LTP residual generating neural network based systems described herein. In one example, advantages of the techniques and systems described herein over conventional codecs include better speech quality at lower bit rates. This advantage is partly based on the elimination of the bit hungry FCB stage of conventional codecs. In addition, it has been shown that neural network models are powerful and robust, allowing harsher quantization of transmitted features while retaining quality. Using a neural network model in place of the FCB can compensate for higher quantization errors in the LP and pitch parameters (e.g., used in the stages following the neural network model, as described above) by appropriately adjusting the output of the neural network model.

Advantages over other ML-based codecs include lower computational complexity. For example, by replacing only one stage of a conventional codec (the FCB) with a neural network model, the neural network needs to model only one component of the speech signal (the FCB) and does not need to model pitch or spectral shape components (handled by the LTP and short-term LP stages, respectively). By modeling only one component of the speech signal, the size and therefore the complexity of the neural network can be kept low relative to ML-based codecs that might model multiple stages of the CELP-codec pipeline. Further, in ML-based codecs that may attempt to replace the entire conventional decoder with a neural network model, the neural network model must model all three speech components (FCB, pitch, and spectral shape), resulting in a high complexity model (e.g., greater than 15 Giga-floating point operations per second (GFLOPs)). In ML-based codecs that my attempt to replace two stages of the conventional codec (e.g., FCB and LTP) with a neural network model, the neural network model must model two speech components (the FCB and pitch when FCB and LTP are replaced with a neural network model), resulting in a lower complexity model than ML-based systems that replace the entire decoder, but still a larger model than what would be required for FCB modeling only.

The techniques and systems described herein use a neural network model to model the FCB component, while other components of a conventional voice decoder (e.g., short-term linear prediction engine and long-term linear prediction engine) are not replaced by a neural network, thereby allowing a reduction of the complexity of the neural network model to the minimum required, allowing a voice codec to achieve a quality target at the desired complexity point.

Moreover, modeling the pitch and spectral shape components of a speech signal requires filtering operations. The LTP and short-term LP stages of a conventional codec are linear, time-varying filters. Filtering operations require multiplications. Neural networks cannot efficiently model time-varying filtering operations, because they cannot efficiently model multiplications of inputs. Because the filter is time varying, the filter cannot be modeled by the neural network weights, which are constant. Rather, the filter coefficients must be provided as additional input to the neural network since they must vary. Neural networks compute linear combinations of inputs and apply a non-linearity to the result. Modeling an input-by-input multiplication requires, therefore, multiple layers/neurons. It can thus be more efficient to implement filtering operations with algorithms (e.g., digital signal processing (DSP) algorithms, such as the LTP and short-term LP filtering algorithms) outside of the neural network model, and not attempt to include such filtering operations inside the neural network model. The systems and techniques provided herein therefore have a computational complexity advantage over both ML-based codecs that may try to replace the entire conventional decoder operation (FCB, LTP, and short-term LP filtering) or that replace two stages of the conventional decoder operation (e.g., FCB and LTP), because both the LTP and short-term LP filtering operations are performed outside the LTP residual generating neural network model.

For a codec structure that may replace the FCB and LTP operations with a neural network model, the neural network must model the LTP filter of a conventional codec. The LTP filter output is the result of a multiplication: $\hat{p}_r(n)=\hat{g}_p\hat{r}(n-T)$, where g is the pitch gain, r is the LP residual, and T is the pitch period, as described above. Modeling the LTP filter operation with a neural network is inefficient for at least two reasons. For instance, modeling the LTP filter operation with a neural network requires remembering past samples: (n-T), where T can be more than 100 samples. Even a state-of-the-art neural network structure (e.g., a recursive neural network (RNN) structure, such as a gated recurrent unit (GRU) or Long Short-Term Memory (LSTM)) cannot keep distant past information in its internal state. Further, modeling the LTP filter operation requires multiplication, which is inefficient to represent with a neural network even if (n-T) is explicitly provided as an input to the neural network and the neural network does not need to rely on memory. The LTP residual generating neural network model models only the LTP residual, and thus does not need to remember past samples nor does it require multiplication operations.

The systems and techniques described herein also provide a convenient framework to integrate other voice coding techniques, such as RCELP (e.g., to allow the LTP module to perform with maximum bit efficiency), selective LTP low-pass filtering at the voice encoder (e.g., decided based on the lowest adaptive codebook (ACB) residual energy), and/or other voice coding techniques.

FIG. 9 is a flowchart illustrating an example of a process 900 for reconstructing one or more audio signals using the techniques described herein. The process 900 can be performed by an audio decoder, such as the voice decoder 304 of FIG. 3, the voice decoder 504 of FIG. 5A or the voice decoder 505 of FIG. 5B, or any of the other voice decoder examples provided herein. The voice decoders described herein can also be used for decoding others types of audio signals other than speech, such as music signals.

At block 902, the process 900 includes generating, using a neural network, a residual signal for at least one sample of an audio signal based on one or more inputs to the neural network. The audio signal can include a speech signal, a music signal, and/or other type of audio signal. The residual signal is configured to excite at least one of a long-term prediction filter and a short-term prediction filter. The long-term prediction filter can include a long-term linear prediction (LTP) filter (e.g., as part of the LTP engine 322, the LTP engine 522, or other LTP engine described herein). The residual signal can include a long-term linear prediction (LTP) residual (e.g., the LTP residual ê(n)) configured to excite the LTP filter. The short-term prediction filter can include a short-term linear prediction (LP) filter (e.g., as part of the short-term LP engine 320, the short-term LP engine 520, or other short-term LP engine described herein). In some implementations, the at least one sample of the audio signal includes a single sample (e.g., which can be processed by the voice coding systems 500A, 500B, 600, or 700). In some implementations, the at least one sample of the audio signal includes a plurality of samples. For instance, the plurality of samples are included in a frame of the audio signal (e.g., which can be processed by the voice coding system 800).

At block 904, the process 900 includes determining, using at least one of the long-term prediction filter and the short-term prediction filter, at least one sample of a reconstructed audio signal. The reconstructed audio signal can include a reconstructed speech signal, a reconstructed music signal, and/or other type of reconstructed audio signal. The at least one sample of the reconstructed audio signal is determined based on the residual signal generated using the neural network for the at least one sample of the audio signal.

In some examples, the process 900 can include determining, using the LTP filter, a linear prediction (LP) residual for the at least one sample of the audio signal. The LP residual can include the LP residual $\hat{r}(n)$ described above. The LP residual for the at least one sample of the audio signal can be determined based on the LTP residual (e.g., ê(n)) generated using the neural network (for the at least one sample of the audio signal) and using an LTP prediction (e.g., the LTP prediction $\hat{p}_r(n)$ described above) for the at least one sample of the audio signal. As described above, the LTP prediction $\hat{p}_r(n)$ can be determined using a gain and an LP residual (e.g., $\hat{r}(n-T)$, such as $\hat{r}(n-1)$) of at least one previous sample of the audio signal. For example, the gain (e.g., the pitch gain) can be applied to the LP residual of the at least one previous sample of the audio signal to generate the LTP prediction (e.g., based on computing $\hat{p}_r(n)=\hat{g}_p\hat{r}(n-T)$).

In some examples, the process 900 can include determining, using the short-term LP filter, the at least one sample of the reconstructed audio signal. The at least one sample of the reconstructed audio signal can be determined based on an LP prediction (e.g., the LP prediction $\hat{p}(n)$ described above) and the LP residual (e.g., the LP residual $\hat{r}(n)$ described above) determined for the at least one sample of the audio signal.

In some examples, the one or more inputs to the neural network include any one or more of the LTP prediction (e.g., $\hat{p}_r(n)$) for the at least one sample of the audio signal, the LP prediction (e.g., $\hat{p}(n)$) for the at least one sample of the audio signal, a previous LTP residual (e.g., ê(n−1)) determined by the neural network for the at least one previous sample of the audio signal, at least one previous sample (e.g., $\hat{s}(n-1)$) of the reconstructed audio signal, or any combination thereof.

Other inputs can include any of the features described above, such as the features 441, the features 541, or other features described herein.

In some examples, the LTP residual generated using the neural network for the at least one sample of the audio signal is combined with the LTP prediction for the at least one sample of the audio signal to generate the LP residual for the at least one sample of the audio signal. For example, as described above with respect to FIG. 5A, the LTP residual ê(n) can be combined with the LTP prediction $\hat{p}_r(n)$) to generate the LP residual r̂(n). In some examples, the LP residual determined for the at least one sample of the audio signal is combined with the LP prediction for the at least one sample of the audio signal to determine the at least one sample of the reconstructed audio signal. For example, as described above with respect to FIG. 5A, the LP residual r̂(n) determined for the at least one sample of the audio signal is combined with the LP prediction p̂(n) of the at least one sample of the audio signal to determine the at least one sample ŝ(n) of the reconstructed audio signal.

In some examples, the residual signal generated by the neural network includes an LP residual configured to excite the short-term LP filter. For instance, as described above with respect to FIG. 5B, process 900 can include determining, using the short-term LP filter, an LTP residual for the at least one sample of the audio signal. The LTP residual for the at least one sample can be determined based on an LP prediction for the at least one sample of the audio signal and the LP residual generated using the neural network, as described above.

In some examples, process 900 can include determining, using the LTP filter, the at least one sample of the reconstructed audio signal. The at least one sample of the reconstructed audio signal can be determined based on the LTP residual (e.g., ê(n)) for the at least one sample of the audio signal and an LTP prediction (e.g., $\hat{p}_r(n)$) of the at least one sample determined using a gain and at least one previous sample of the reconstructed audio signal (e.g., ŝ(n−T) of a previous sample n−T).

The above-described examples described with respect to FIG. 9 can be used individually or in any combination.

FIG. 10 is a flowchart illustrating an example of a process 1000 for reconstructing one or more audio signals using the techniques described herein. The process 1000 can be performed by a voice decoder, such as the voice decoder 304 of FIG. 3, the voice decoder 504 of FIG. 5A or the voice decoder 505 of FIG. 5B, or any of the other voice decoder examples provided herein.

At block 1002, the process 1000 includes generating, using the neural network, a long-term linear prediction (LTP) residual for at least one sample of an audio signal based on one or more inputs. The audio signal can include a speech signal, a music signal, and/or other type of audio signal. The LTP residual is configured to excite an LTP filter. The LTP filter can be part of the LTP engine 322, the LTP engine 522, or other LTP engine described herein. In some implementations, the at least one sample of the audio signal includes a single sample (e.g., which can be processed by the voice coding systems 500A, 500B, 600, or 700). In some implementations, the at least one sample of the audio signal includes a plurality of samples. For instance, the plurality of samples are included in a frame of the audio signal (e.g., which can be processed by the voice coding system 800).

At block 1004, the process 1000 includes determining, using the LTP filter, a linear prediction (LP) residual for the at least one sample of the audio signal. The LP residual for the at least one sample of the audio signal can be determined based on the LTP residual generated using the neural network for the at least one sample and an LTP prediction of the at least one sample determined using a gain and an LP residual of at least one previous sample of the audio signal. The LTP residual can include the LTP residual ê(n), and the LP residual can include the LP residual r̂(n) described above. As previously described, the LTP prediction $\hat{p}_r(n)$ can be determined using a gain and an LP residual (e.g., r̂(n−T), such as r̂(n−1)) of at least one previous sample of the audio signal. For example, the gain (e.g., the pitch gain) can be applied to the LP residual of the at least one previous sample of the audio signal to generate the LTP prediction (e.g., based on computing $\hat{p}_r(n) = \hat{g}_p \hat{r}(n−T)$).

At block 1006, the process 1000 includes determining, using a short-term linear prediction (LP) filter, at least one sample of a reconstructed audio signal. The reconstructed audio signal can include a reconstructed speech signal, a reconstructed music signal, and/or other type of reconstructed audio signal. The at least one sample of the reconstructed audio signal can be determined based on an LP prediction (e.g., the LP prediction p̂(n) described above) and the LP residual (e.g., the LP residual r̂(n) described above) determined for the at least one sample of the audio signal.

In some examples, the one or more inputs to the neural network include any one or more of the LTP prediction (e.g., $\hat{p}_r(n)$) for the at least one sample of the audio signal, the LP prediction (e.g., p̂(n)) for the at least one sample of the audio signal, a previous LTP residual (e.g., ê(n−1)) determined by the neural network for the at least one previous sample of the audio signal, at least one previous sample (e.g., ŝ(n−1)) of the reconstructed audio signal, or any combination thereof. Other inputs can include any of the features described above, such as the features 441, the features 541, or other features described herein.

In some examples, the LTP residual generated using the neural network for the at least one sample of the audio signal is combined with the LTP prediction for the at least one sample of the audio signal to generate the LP residual for the at least one sample of the audio signal. For example, as described above with respect to FIG. 5A, the LTP residual ê(n) can be combined with the LTP prediction $\hat{p}_r(n)$) to generate the LP residual r̂(n). In some examples, the LP residual determined for the at least one sample of the audio signal is combined with the LP prediction for the at least one sample of the audio signal to determine the at least one sample of the reconstructed audio signal. For example, as described above with respect to FIG. 5A, the LP residual r̂(n) determined for the at least one sample of the audio signal is combined with the LP prediction p̂(n) of the at least one sample of the audio signal to determine the at least one sample ŝ(n) of the reconstructed audio signal The above-described examples described with respect to FIG. 10 can be used individually or in any combination.

In some examples, the processes 900 and 1000 may be performed by a computing device or an apparatus, such as a device (e.g., a device having the computing system 1100) including the voice coding system 300 or other voice coding system described herein. In some cases, the computing device or apparatus may include one or more input devices, one or more output devices, one or more processors, one or more microprocessors, one or more microcomputers, and/or other component(s) that is/are configured to carry out the steps of processes 900 and 1000. In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display and/or a speaker (as examples of output devices), a network interface configured to communicate and/or receive data, one or more receivers, transmitters, and/or transceivers (as examples of input devices and/or output devices) configured to communicate the voice data. In some examples, the network interface, transceiver, and/or transmitter may be configured to communicate Internet Protocol (IP) based data or other network data.

Processes 900 and 1000 are illustrated as logical flow diagrams, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 900 and 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
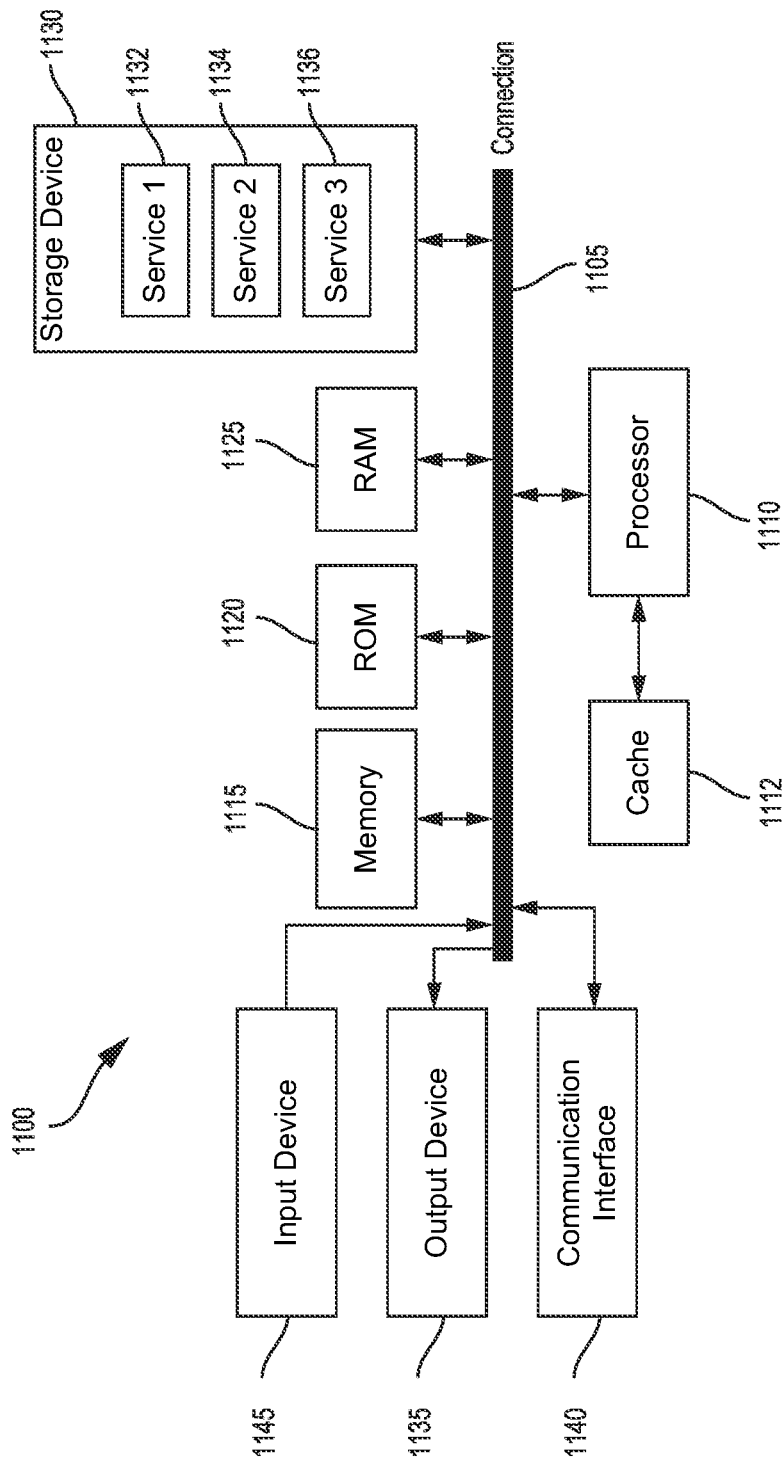
FIG. 11 is an example computing device architecture of an example computing device that can implement the various techniques described herein.

FIG. 11 shows an example of computing system 1100, which can implement the various techniques described herein. For example, the computing system 1100 can implement the voice coding system 300 shown in FIG. 3 or any other voice coding system described herein. The components of the computing system 1100 are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache of high-speed memory 1112 connected directly with, in close proximity to, or integrated as part of processor 1110. In some cases, the computing system 1100 can copy data from memory 1115 and/or the storage device 1130 to the cache 1112 for quick access by processor 1110. In this way, the cache can provide a performance enhancement that avoids processor 1110 delays while waiting for data. These and other modules can control or be configured to control processor 1110 to perform various actions. Other computing device memory 1115 may be available for use as well. Memory 1115 can include multiple different types of memory with different performance characteristics.

Processor 1110 can include any general purpose processor and a hardware service or software service, such as a service 1 1132, a service 2 1134, and a service 3 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art, such as a display, projector, television, speaker device, etc. In some instances, multimodal systems can enable a user to provide multiple types of input/output to communicate with computing system 1100. Computing system 1100 can include communication interface 1140, which can generally govern and manage the user input and system output. The communication interface may perform or facilitate receipt and/or transmission of wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communication interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc optical disc, a holographic optical disk, another optical medium, a secure digital (SD) card, a micro secure digital (microSD) card, a Memory Stick® card, a smartcard chip, a Europay Mastercard and Visa (EMV) chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAIVI/ReRAM), phase change memory (PCM), spin transfer torque RAM (STT-RAM), another memory chip or cartridge, and/or a combination thereof.

The storage device 1130 can include software services (e.g., service 1 1132, service 2 1134, and service 3 1136, and/or other services), servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAIVI), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Example 1

An apparatus for reconstructing one or more audio signals, comprising: a memory configured to store audio data; and one or more processors implemented in circuitry and coupled to the memory, the one or more processors configured to: generate, using a neural network, a residual signal for at least one sample of an audio signal based on one or more inputs to the neural network, the residual signal being configured to excite at least one of a long-term prediction filter and a short-term prediction filter; and determine, using at least one of the long-term prediction filter and the short-term prediction filter, at least one sample of a reconstructed audio signal, the at least one sample of the reconstructed audio signal being determined based on the residual signal generated using the neural network for the at least one sample of the audio signal.

Example 2

An apparatus according to Example 1, wherein the long-term prediction filter is a long-term linear prediction (LTP) filter.

Example 3

An apparatus according to any of Examples 1 or 2, wherein the residual signal includes a long-term linear prediction (LTP) residual configured to excite the LTP filter.

Example 4

An apparatus according to Example 3, wherein the one or more processors are configured to: determine, using the LTP filter, a linear prediction (LP) residual for the at least one sample of the audio signal, the LP residual for the at least one sample of the audio signal being determined based on the LTP residual generated using the neural network for the at least one sample of the audio signal and an LTP prediction for the at least one sample of the audio signal determined using a gain and an LP residual of at least one previous sample of the audio signal.

Example 5

An apparatus according to Example 4, wherein the gain is applied to the LP residual of the at least one previous sample of the audio signal.

Example 6

An apparatus according to any of Examples 4 through 5, wherein the short-term prediction filter is a short-term linear prediction (LP) filter.

Example 7

An apparatus according to Example 6, wherein the one or more processors are configured to: determine, using the short-term LP filter, the at least one sample of the reconstructed audio signal, the at least one sample of the reconstructed audio signal being determined based on an LP prediction and the LP residual determined for the at least one sample of the audio signal.

Example 8

An apparatus according to any of Examples 1 through 7, wherein the one or more inputs to the neural network include at least one of the LTP prediction for the at least one sample of the audio signal, the LP prediction for the at least one sample of the audio signal, a previous LTP residual determined by the neural network for the at least one previous sample of the audio signal, and at least one previous sample of the reconstructed audio signal.

Example 9

An apparatus according to any of Examples 4 through 8, wherein the LTP residual generated using the neural network for the at least one sample of the audio signal is combined with the LTP prediction for the at least one sample of the audio signal to generate the LP residual for the at least one sample of the audio signal.

Example 10

An apparatus according to any of Examples 4 through 9, wherein the LP residual determined for the at least one sample of the audio signal is combined with the LP prediction for the at least one sample of the audio signal to determine the at least one sample of the reconstructed audio signal.

Example 11

An apparatus according to any of Examples 1 through 10, wherein the short-term prediction filter is a short-term linear prediction (LP) filter.

Example 12

An apparatus according to any of Examples 1 through 11, wherein the residual signal includes a linear prediction (LP) residual configured to excite the short-term LP filter.

Example 13

An apparatus according to any of Examples 11 through 12, wherein the one or more processors are configured to: determine, using the short-term LP filter, a long-term linear prediction (LTP) residual for the at least one sample of the audio signal, the LTP residual for the at least one sample being determined based on an LP prediction for the at least one sample of the audio signal and the LP residual generated using the neural network.

Example 14

An apparatus according to any of Examples 11 through 13, wherein the long-term prediction filter is a long-term linear prediction (LTP) filter.

Example 15

An apparatus according to Examples 14, wherein the one or more processors are configured to: determine, using the LTP filter, the at least one sample of the reconstructed audio signal, the at least one sample of the reconstructed audio signal being determined based on the LTP residual for the at least one sample of the audio signal and an LTP prediction of the at least one sample of the audio signal determined using a gain and at least one previous sample of the reconstructed audio signal.

Example 16

An apparatus according to any of Examples 1 through 15, wherein the at least one sample of the audio signal includes a single sample.

Example 17

An apparatus according to any of Examples 1 through 16, wherein the at least one sample of the audio signal includes a plurality of samples.

Example 18

An apparatus according to any of Examples 1 through 17, wherein the plurality of samples are included in a frame of the audio signal.

Example 19

An apparatus according to any of Examples 1 through 18, wherein the audio signal includes a speech signal, and wherein the reconstructed audio signal includes a reconstructed speech signal.

Example 20

A method of reconstructing one or more audio signals, comprising: generating, using a neural network, a residual signal for at least one sample of an audio signal based on one or more inputs to the neural network, the residual signal being configured to excite at least one of a long-term prediction filter and a short-term prediction filter; and determining, using at least one of the long-term prediction filter and the short-term prediction filter, at least one sample of a reconstructed audio signal, the at least one sample of the reconstructed audio signal being determined based on the residual signal generated using the neural network for the at least one sample of the audio signal.

Example 21

A method according to Example 20, wherein the long-term prediction filter is a long-term linear prediction (LTP) filter.

Example 22

A method according to any of Examples 20 or 21, wherein the residual signal includes a long-term linear prediction (LTP) residual configured to excite the LTP filter.

Example 23

A method according to Example 22, wherein the one or more processors are configured to: determine, using the LTP filter, a linear prediction (LP) residual for the at least one sample of the audio signal, the LP residual for the at least one sample of the audio signal being determined based on the LTP residual generated using the neural network for the at least one sample of the audio signal and an LTP prediction for the at least one sample of the audio signal determined using a gain and an LP residual of at least one previous sample of the audio signal.

Example 24

A method according to Example 23, wherein the gain is applied to the LP residual of the at least one previous sample of the audio signal.

Example 25

A method according to any of Examples 23 through 24, wherein the short-term prediction filter is a short-term linear prediction (LP) filter.

Example 26

A method according to Example 25, further comprising determining, using the short-term LP filter, the at least one sample of the reconstructed audio signal, the at least one sample of the reconstructed audio signal being determined based on an LP prediction and the LP residual determined for the at least one sample of the audio signal.

Example 27

A method according to any of Examples 20 through 26, wherein the one or more inputs to the neural network include at least one of the LTP prediction for the at least one sample of the audio signal, the LP prediction for the at least one sample of the audio signal, a previous LTP residual determined by the neural network for the at least one previous sample of the audio signal, and at least one previous sample of the reconstructed audio signal.

Example 28

A method according to any of Examples 23 through 27, wherein the LTP residual generated using the neural network for the at least one sample of the audio signal is combined with the LTP prediction for the at least one sample of the audio signal to generate the LP residual for the at least one sample of the audio signal.

Example 29

A method according to any of Examples 23 through 28, wherein the LP residual determined for the at least one sample of the audio signal is combined with the LP prediction for the at least one sample of the audio signal to determine the at least one sample of the reconstructed audio signal.

Example 30

A method according to any of Examples 20 through 29, wherein the short-term prediction filter is a short-term linear prediction (LP) filter.

Example 31

A method according to any of Examples 20 through 30, wherein the residual signal includes a linear prediction (LP) residual configured to excite the short-term LP filter.

Example 32

A method according to any of Examples 30 through 31, further comprising determining, using the short-term LP filter, a long-term linear prediction (LTP) residual for the at least one sample of the audio signal, the LTP residual for the at least one sample being determined based on an LP prediction for the at least one sample of the audio signal and the LP residual generated using the neural network.

Example 33

A method according to any of Examples 30 through 32, wherein the long-term prediction filter is a long-term linear prediction (LTP) filter.

Example 34

A method according to Examples 33, further comprising determining, using the LTP filter, the at least one sample of the reconstructed audio signal, the at least one sample of the reconstructed audio signal being determined based on the LTP residual for the at least one sample of the audio signal and an LTP prediction of the at least one sample of the audio signal determined using a gain and at least one previous sample of the reconstructed audio signal.

Example 35

A method according to any of Examples 20 through 34, wherein the at least one sample of the audio signal includes a single sample.

Example 36

A method according to any of Examples 20 through 35, wherein the at least one sample of the audio signal includes a plurality of samples.

Example 37

A method according to any of Examples 20 through 36, wherein the plurality of samples are included in a frame of the audio signal.

Example 38

A method according to any of Examples 20 through 37, wherein the audio signal includes a speech signal, and wherein the reconstructed audio signal includes a reconstructed speech signal.

In some implementations, the above-described examples 1-19 and/or 20-38 can be implemented using a computer-readable storage medium storing instructions that when executed cause one or more processors of a device to perform some or all of the various operations. For example, a computer-readable storage medium can be provided storing instructions that when executed cause one or more processors of a device for decoding video data to: generate, using a neural network, a residual signal for at least one sample of an audio signal based on one or more inputs to the neural network, the residual signal being configured to excite at least one of a long-term prediction filter and a short-term prediction filter; and determine, using at least one of the long-term prediction filter and the short-term prediction filter, at least one sample of a reconstructed audio signal, the at least one sample of the reconstructed audio signal being determined based on the residual signal generated using the neural network for the at least one sample of the audio signal.

In some implementations, the above-described examples 1-19 and/or 20-38 can be implemented using an apparatus comprising one or more means for performing some or all of the various operations. For example, an apparatus for reconstructing one or more audio signals can be provided, comprising: means for generating, using a neural network, a residual signal for at least one sample of an audio signal based on one or more inputs to the neural network, the residual signal being configured to excite at least one of a long-term prediction filter and a short-term prediction filter; and means for determining, using at least one of the long-term prediction filter and the short-term prediction filter, at least one sample of a reconstructed audio signal, the at least one sample of the reconstructed audio signal being determined based on the residual signal generated using the neural network for the at least one sample of the audio signal.

What is claimed is:

1. An apparatus for reconstructing one or more audio signals, comprising:
    a memory configured to store audio data; and
    one or more processors implemented in circuitry and coupled to the memory, the one or more processors configured to:
        process one or more inputs using a neural network of an audio decoder, the one or more inputs including a long-term prediction for at least one sample of an audio signal, a linear prediction for the at least one sample of the audio signal, and at least one previous sample of a reconstructed audio signal;
        generate, based on processing the one or more inputs using the neural network of the audio decoder, a residual signal for the at least one sample of the audio signal, the residual signal being configured to excite at least one of a long-term prediction filter and a short-term prediction filter of the audio decoder; and
        determine, using at least one of the long-term prediction filter and the short-term prediction filter, at least one sample of the reconstructed audio signal, the at least one sample of the reconstructed audio signal being determined based on the residual signal generated using the neural network for the at least one sample of the audio signal.

2. The apparatus of claim 1, wherein the audio signal includes a speech signal, and wherein the reconstructed audio signal includes a reconstructed speech signal.

3. The apparatus of claim 1, wherein the at least one sample of the audio signal includes a single sample.

4. The apparatus of claim 1, wherein the at least one sample of the audio signal includes a plurality of samples.

5. The apparatus of claim 4, wherein the plurality of samples are included in a frame of the audio signal.

6. The apparatus of claim 1, wherein the short-term prediction filter is a short-term linear prediction (LP) filter.

7. The apparatus of claim 6, wherein the residual signal includes a linear prediction (LP) residual configured to excite the short-term LP filter.

8. The apparatus of claim 7, wherein the one or more processors are configured to:
    determine, using the short-term LP filter, a long-term linear prediction (LTP) residual for the at least one sample of the audio signal, the LTP residual for the at least one sample being determined based on the linear prediction for the at least one sample of the audio signal and the LP residual generated using the neural network.

9. The apparatus of claim 8, wherein the long-term prediction filter is a long-term linear prediction (LTP) filter.

10. The apparatus of claim 9, wherein the long-term prediction for the at least one sample of the audio signal includes an LTP prediction, and wherein the one or more processors are configured to:
determine, using the LTP filter, the at least one sample of the reconstructed audio signal, the at least one sample of the reconstructed audio signal being determined based on the LTP residual for the at least one sample of the audio signal and the LTP prediction of the at least one sample of the audio signal, wherein the LTP prediction for the at least one sample is determined using a gain and the at least one previous sample of the reconstructed audio signal.

11. The apparatus of claim 1, wherein the long-term prediction filter is a long-term linear prediction (LTP) filter.

12. The apparatus of claim 11, wherein the residual signal includes a long-term linear prediction (LTP) residual configured to excite the LTP filter.

13. The apparatus of claim 12, wherein the long-term prediction for the at least one sample of the audio signal includes an LTP prediction, and wherein the one or more processors are configured to:
determine, using the LTP filter, a linear prediction (LP) residual for the at least one sample of the audio signal, the LP residual for the at least one sample of the audio signal being determined based on the LTP residual generated using the neural network for the at least one sample of the audio signal and the LTP prediction for the at least one sample of the audio signal, wherein the LTP prediction for the at least one sample is determined using a gain and an LP residual of the at least one previous sample of the audio signal.

14. The apparatus of claim 13, wherein the gain is applied to the LP residual of the at least one previous sample of the audio signal.

15. The apparatus of claim 13, wherein the short-term prediction filter is a short-term linear prediction (LP) filter.

16. The apparatus of claim 15, wherein the one or more processors are configured to:
determine, using the short-term LP filter, the at least one sample of the reconstructed audio signal, the at least one sample of the reconstructed audio signal being determined based on the linear prediction and the LP residual determined for the at least one sample of the audio signal.

17. The apparatus of claim 16, wherein the one or more inputs to the neural network further include a previous LTP residual determined by the neural network for the at least one previous sample of the audio signal.

18. The apparatus of claim 16, wherein the LTP residual generated using the neural network for the at least one sample of the audio signal is combined with the LTP prediction for the at least one sample of the audio signal to generate the LP residual for the at least one sample of the audio signal.

19. The apparatus of claim 16, wherein the LP residual determined for the at least one sample of the audio signal is combined with the linear prediction for the at least one sample of the audio signal to determine the at least one sample of the reconstructed audio signal.

20. A method of reconstructing one or more audio signals, the method comprising:
processing one or more inputs using a neural network of an audio decoder, the one or more inputs including a long-term prediction for at least one sample of an audio signal, a linear prediction for the at least one sample of the audio signal, and at least one previous sample of a reconstructed audio signal;
generating, based on processing the one or more inputs using the neural network of the audio decoder, a residual signal for the at least one sample of the audio signal, the residual signal being configured to excite at least one of a long-term prediction filter and a short-term prediction filter of the audio decoder; and
determining, using at least one of the long-term prediction filter and the short-term prediction filter, at least one sample of the reconstructed audio signal, the at least one sample of the reconstructed audio signal being determined based on the residual signal generated using the neural network for the at least one sample of the audio signal.

21. The method of claim 20, wherein the at least one sample of the audio signal includes a single sample.

22. The method of claim 20, wherein the audio signal includes a speech signal, and wherein the reconstructed audio signal includes a reconstructed speech signal.

23. The method of claim 20, wherein the at least one sample of the audio signal includes a plurality of samples.

24. The method of claim 23, wherein the plurality of samples are included in a frame of the audio signal.

25. The method of claim 20, wherein the short-term prediction filter is a short-term linear prediction (LP) filter.

26. The method of claim 25, wherein the residual signal includes a linear prediction (LP) residual configured to excite the short-term LP filter.

27. The method of claim 26, further comprising:
determining, using the short-term LP filter, a long-term linear prediction (LTP) residual for the at least one sample of the audio signal, the LTP residual for the at least one sample being determined based on the linear prediction for the at least one sample of the audio signal and the LP residual generated using the neural network.

28. The method of claim 27, wherein the long-term prediction filter is a long-term linear prediction (LTP) filter.

29. The method of claim 28, wherein the long-term prediction for the at least one sample of the audio signal includes an LTP prediction, the method further comprising:
determining, using the LTP filter, the at least one sample of the reconstructed audio signal, the at least one sample of the reconstructed audio signal being determined based on the LTP residual for the at least one sample of the audio signal and the LTP prediction of the at least one sample of the audio signal, wherein the LTP prediction for the at least one sample is determined using a gain and the at least one previous sample of the reconstructed audio signal.

30. The method of claim 20, wherein the long-term prediction filter is a long-term linear prediction (LTP) filter.

31. The method of claim 30, wherein the residual signal includes a long-term linear prediction (LTP) residual configured to excite the LTP filter.

32. The method of claim 31, wherein the long-term prediction for the at least one sample of the audio signal includes an LTP prediction, the method further comprising:
determining, using the LTP filter, a linear prediction (LP) residual for the at least one sample of the audio signal, the LP residual for the at least one sample of the audio signal being determined based on the LTP residual generated using the neural network for the at least one sample of the audio signal and an LTP prediction for the at least one sample of the audio signal, wherein the LTP prediction for the at least one sample is determined using a gain and an LP residual of the at least one previous sample of the audio signal.

33. The method of claim 32, wherein the gain is applied to the LP residual of the at least one previous sample of the audio signal.

34. The method of claim 32, wherein the short-term prediction filter is a short-term linear prediction (LP) filter.

35. The method of claim 34, further comprising:
determining, using the short-term LP filter, the at least one sample of the reconstructed audio signal, the at least one sample of the reconstructed audio signal being determined based on the linear prediction and the LP residual determined for the at least one sample of the audio signal.

36. The method of claim 35, wherein the one or more inputs to the neural network further include a previous LTP residual determined by the neural network for the at least one previous sample of the audio signal.

37. The method of claim 35, wherein the LTP residual generated using the neural network for the at least one sample of the audio signal is combined with the LTP prediction for the at least one sample of the audio signal to generate the LP residual for the at least one sample of the audio signal.

38. The method of claim 35, wherein the LP residual determined for the at least one sample of the audio signal is combined with the linear prediction for the at least one sample of the audio signal to determine the at least one sample of the reconstructed audio signal.

39. A non-transitory computer-readable storage medium storing instructions that when executed cause one or more processors of a device to:
process one or more inputs using a neural network of an audio decoder, the one or more inputs including a long-term prediction for at least one sample of an audio signal, a linear prediction for the at least one sample of the audio signal, and at least one previous sample of a reconstructed audio signal;
generate, based on processing the one or more inputs using the neural network of the audio decoder, a residual signal for the at least one sample of the audio signal, the residual signal being configured to excite at least one of a long-term prediction filter and a short-term prediction filter of the audio decoder; and
determine, using at least one of the long-term prediction filter and the short-term prediction filter, at least one sample of the reconstructed audio signal, the at least one sample of the reconstructed audio signal being determined based on the residual signal generated using the neural network for the at least one sample of the audio signal.

* * * * *